(12) United States Patent
Ishii

(10) Patent No.: US 10,310,521 B2
(45) Date of Patent: Jun. 4, 2019

(54) BYPASS UNIT, A BASE FOR A FLOW METER, A BASE FOR A FLOW CONTROLLER, A FLOW METER, AND A FLOW CONTROLLER

(71) Applicant: Hitachi Metals, Ltd., Minato-ku, Tokyo (JP)

(72) Inventor: Mamoru Ishii, Mie (JP)

(73) Assignee: Hitachi Metals, Ltd., Tokyo (JP)

( * ) Notice: Subject to any disclaimer, the term of this patent is extended or adjusted under 35 U.S.C. 154(b) by 8 days.

(21) Appl. No.: 15/480,476

(22) Filed: Apr. 6, 2017

(65) Prior Publication Data
US 2017/0293308 A1   Oct. 12, 2017

(30) Foreign Application Priority Data

Apr. 7, 2016  (JP) .................................. 2016-077332
Jan. 27, 2017  (JP) .................................. 2017-013426

(51) Int. Cl.
| | |
|---|---|
| G05D 7/06 | (2006.01) |
| G01F 15/00 | (2006.01) |
| G01F 1/68 | (2006.01) |
| G01F 5/00 | (2006.01) |

(52) U.S. Cl.
CPC .............. *G05D 7/0635* (2013.01); *G01F 1/68* (2013.01); *G01F 5/00* (2013.01); *G01F 15/00* (2013.01); *G01F 15/005* (2013.01)

(58) Field of Classification Search
CPC ..... G05D 7/0635; G01F 15/00; G01F 15/005; G01F 1/68; G01F 5/00; Y10T 137/87249; Y10T 137/87354; Y10T 137/87338; Y10T 137/2224

USPC ....................... 73/202, 202.5, 202.21, 204.21
See application file for complete search history.

(56) References Cited

U.S. PATENT DOCUMENTS

| | | | |
|---|---|---|---|
| 3,851,526 A | * | 12/1974 | Drexel ...................... G01F 1/42 138/42 |
| 4,930,357 A | | 6/1990 | Thurston et al. |
| 4,949,755 A | | 8/1990 | Thurston et al. |

(Continued)

FOREIGN PATENT DOCUMENTS

| | | |
|---|---|---|
| JP | S502968 A | 1/1975 |
| JP | 0140300 B | 1/1985 |

(Continued)

*Primary Examiner* — Michael R Reid
*Assistant Examiner* — Patrick C Williams
(74) *Attorney, Agent, or Firm* — Neugeboren O'Dowd PC

(57) ABSTRACT

Several types of flow apparatus are disclosed including bypass parts, mass flow meters, and mass flow controllers are disclosed. A bypass unit includes a bypass part that is a plate-like member and a pair of external connection parts that is a pair of plate-like members laminated on two principal surfaces of the bypass part, respectively. The bypass part includes one first member or a laminated object of the first members. The first member is a sheet-like member in which a first inlet hole, a first outlet hole, and a groove, which makes these holes communicate with each other are formed. A second inlet hole and a second outlet hole are formed in the external connection part. The first inlet hole and the second inlet hole are configured to airtightly communicate, and the first outlet hole and the second outlet hole are configured to airtightly communicate with each other.

17 Claims, 17 Drawing Sheets

(56) References Cited

U.S. PATENT DOCUMENTS

| | | | | |
|---|---|---|---|---|
| 5,511,416 A | * | 4/1996 | Shambayati | F15D 1/02 138/43 |
| 6,543,466 B2 | * | 4/2003 | Gill | G05D 7/0635 137/10 |
| 7,431,045 B2 | * | 10/2008 | Mudd | G05D 7/0186 137/487.5 |
| 7,591,177 B2 | * | 9/2009 | Sugimoto | G01F 1/6847 73/204.27 |
| 7,641,865 B2 | | 1/2010 | Tonkovich et al. | |
| 9,134,079 B2 | | 9/2015 | Tonkovich et al. | |
| 9,188,990 B2 | * | 11/2015 | Yasuda | G05D 7/0635 |
| 2004/0163461 A1 | * | 8/2004 | Ito | G01F 1/6842 73/204.21 |
| 2016/0048136 A1 | | 2/2016 | Yasuda | |

FOREIGN PATENT DOCUMENTS

| | | |
|---|---|---|
| JP | 0445925 A | 4/1992 |
| JP | 2001336958 A | 12/2001 |
| JP | 2005534007 A | 11/2005 |
| JP | 2009192220 A | 8/2009 |

* cited by examiner

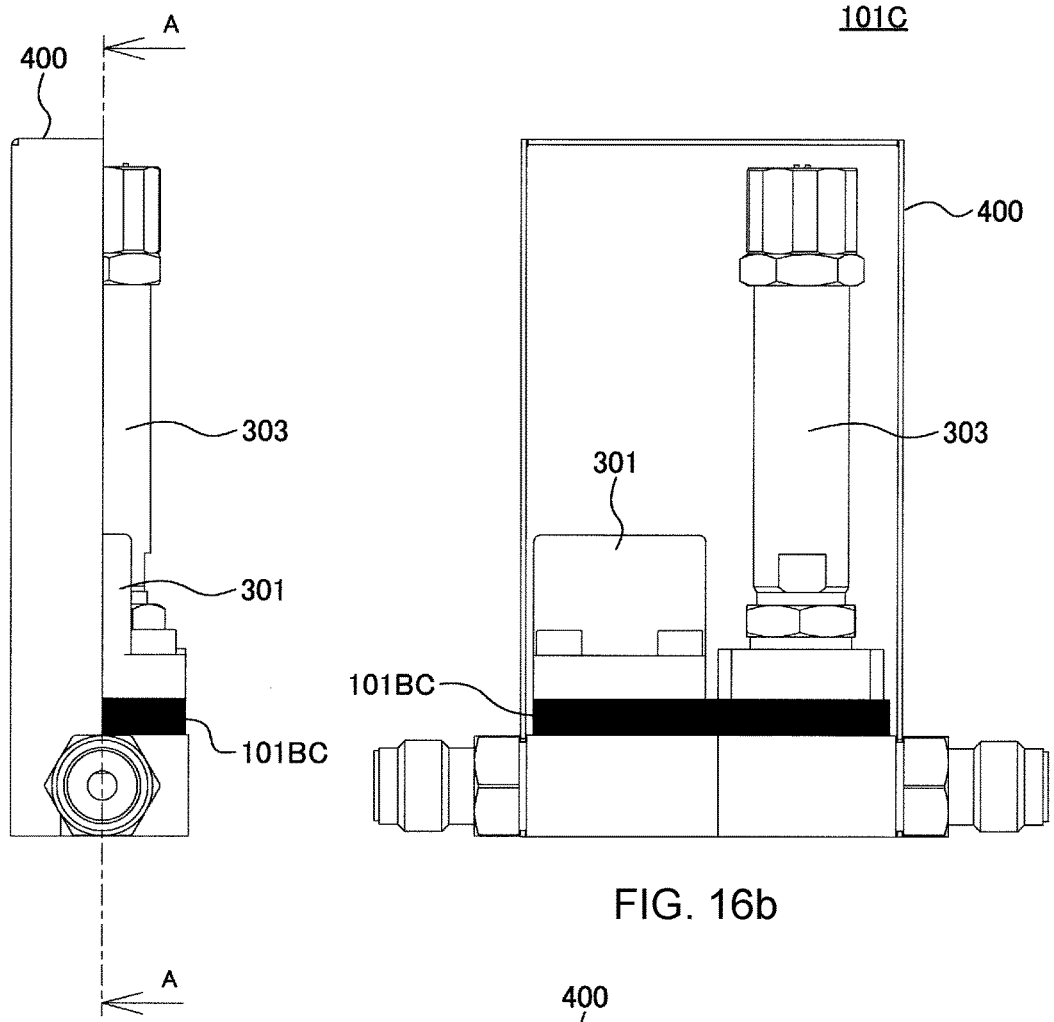
FIG. 16a
FIG. 16b
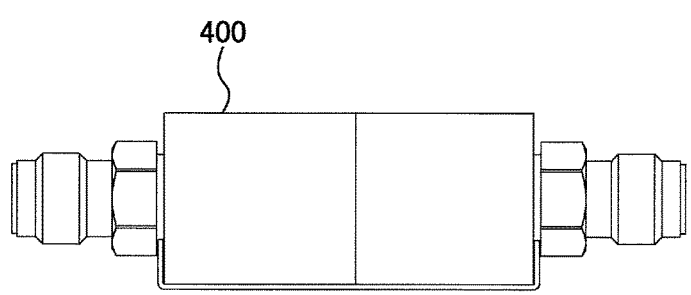
FIG. 16c

BYPASS UNIT, A BASE FOR A FLOW METER, A BASE FOR A FLOW CONTROLLER, A FLOW METER, AND A FLOW CONTROLLER

CLAIM OF PRIORITY UNDER 35 U.S.C. § 119

The present Application for Patent claims priority to Japanese Patent Application No. 2016-077332, filed Apr. 7, 2016 and Japanese Patent Application No. 2017-013426 filed Jan. 27, 2017, and assigned to the assignee hereof and hereby expressly incorporated by reference herein.

BACKGROUND

Field

The present invention relates to flow apparatus including a bypass unit, a base for a flow meter, a base for a flow controller, a flow meter, and a flow controller. More particularly, the present invention relates to a bypass unit, a base for a flow meter, a base for a flow controller, a flow meter, and a flow controller, wherein a main flow passage, through which fluid that is a target for measurement of a flow rate flows, and a bypass which intervenes in the main flow passage are integrally formed inside thereof.

Background

In the art, a flow meter comprising what is called a "bypass" as a resistor prepared in a main flow passage of fluid is known. A bypass in a thermal type flow rate sensor functions as a laminar flow element which determines a splitting ratio between a main flow passage and a sensor tube in communication with an upstream side and a downstream side of a bypass in the main flow passage. Moreover, a bypass in a differential pressure type flow rate sensor functions as a differential pressure generating means to generate pressure difference between an upstream side and a downstream side of the bypass in a main flow passage.

As a structure of a typical bypass, for example, a structure where a plurality of capillary tubes are bundled in parallel with each other (for example, refer to Japanese Unexamined Patent Application Publication No. 2005-534007), a structure where a plurality of disks in which a communication passage extending from a through-hole formed in its center toward its periphery is formed is laminated in an axis direction (for example, refer to Japanese Examined Patent Application Publication No. Sho 54-3743 (Japanese Unexamined Patent Application Publication No. Sho 50-2968)), and a structure multilayered by vortically winding up a lamination of a wavelike board and a flat sheet (thin board) (for example, refer to Japanese Unexamined Patent Application Publication No. Hei 04-45925 and Japanese Unexamined Patent Application Publication No. 2009-192220).

However, when a bypass which has the above-mentioned structure is manufactured with general processing accuracy, a possibility that variation in the cross section of the whole flow passage in a bypass (which may be referred to as a "bypass flow passage" hereinafter) may become large and an accurate flow measurement may become difficult will increase. Namely, in manufacture of a bypass which has a structure as mentioned above, an advanced manufacturing technology which can attain very high processing accuracy is required. As a result, there is a problem that it leads to increase in a manufacturing cost when a bypass which has high accuracy of dimension is manufactured in order to attain high measurement accuracy.

Furthermore, a bypass (laminar flow element) manufactured by laminating and unitizing a predetermined number of sheets (etching plates), in which many fine pores having an identical shape and layout are formed, by a braze joining or a diffusion joining, in a state that positions (phase) of these fine pores coincide, is also known (refer to Japanese Examined Patent Application Publication No. Hei 01-40300 and Japanese Unexamined Patent Application Publication No. 2001-336958).

However, since the length of the bypass flow passage in the above-mentioned bypass is proportional to a lamination number of the etching plates, when a long bypass flow passage is to be formed, many etching plates must be joined in a state that the positions (phase) of the fine pores coincide. As a result, there is a problem that manufacturing efficiency becomes worse or a fraction defective becomes higher. Moreover, in order to form many fine pores in an etching plate with high accuracy of dimension, an advanced manufacturing technology which can attain very high processing accuracy is required. Therefore, also in the above-mentioned bypass, there is a problem that when a bypass which has high accuracy of dimension is to be manufactured in order to attain high measurement accuracy, there is a problem that it leads to increase in a manufacturing cost when a bypass which has high accuracy of dimension is manufactured in order to attain high measurement accuracy.

SUMMARY

According to an aspect, a flow apparatus including a bypass unit is disclosed that includes a bypass part that is a member having a shape of a plate, and a pair of external connection parts that is a pair of members having a shape of a plate and being laminated on two principal surfaces of said bypass part, respectively.

The bypass part comprises one first member that is a member having a shape of a sheet, in which a first inlet hole that is at least one through-hole having a predetermined size and a predetermined shape, a first outlet hole that is at least one through-hole having a predetermined size and a predetermined shape, and at least one groove in communication with said first inlet hole and said first outlet hole are formed, or the bypass part comprises two or more said first members laminated such that said first inlet holes of said first members adjacent to each other airtightly communicate with each other and said first outlet holes of said first members adjacent to each other airtightly communicate with each other. The bypass part also includes a second inlet hole that is at least one through-hole having a predetermined size and a predetermined shape is formed in either of said pair of said external connection parts, and a second outlet hole that is at least one through-hole having a predetermined size and a predetermined shape is formed in either of said pair of said external connection parts. The first inlet hole formed in said first member and said second inlet hole formed in said external connection part are configured to airtightly communicate with each other, and said first outlet hole formed in said first member and said second outlet hole formed in said external connection part are configured to airtightly communicate with each other.

According to another aspect, the flow apparatus includes an inlet side branch hole that is at least one through-hole having a predetermined size and a predetermined shape and airtightly communicating with said first inlet hole is further formed in either of said pair of said external connection parts; and an outlet side branch hole that is at least one through-hole having a predetermined size and a predetermined shape and airtightly communicating with said first outlet hole is further formed in either of said pair of said external connection parts.

Other aspects include a thermal type flow meter including the base for a flow meter, a sensor tube and a pair of sensor wires wound around said sensor tube, and alternatively, a differential pressure type flow meter including the base for a flow meter, an upstream side pressure sensor and a downstream side pressure sensor.

BRIEF DESCRIPTION OF THE DRAWINGS

FIGS. 16a, 16b, and 16c are a side view, front elevational view, and plan view, respectively, of a thermal type flow controller according to a Working Example 10 of the present invention (Working Example 10 thermal type flow controller).

FIGS. 17a and 17b are a sectional view and a partially enlarged view of the Working Example 10 thermal type flow controller by a cross-section A-A shown in FIG. 16a.

DETAILED DESCRIPTION

Figure 1A:
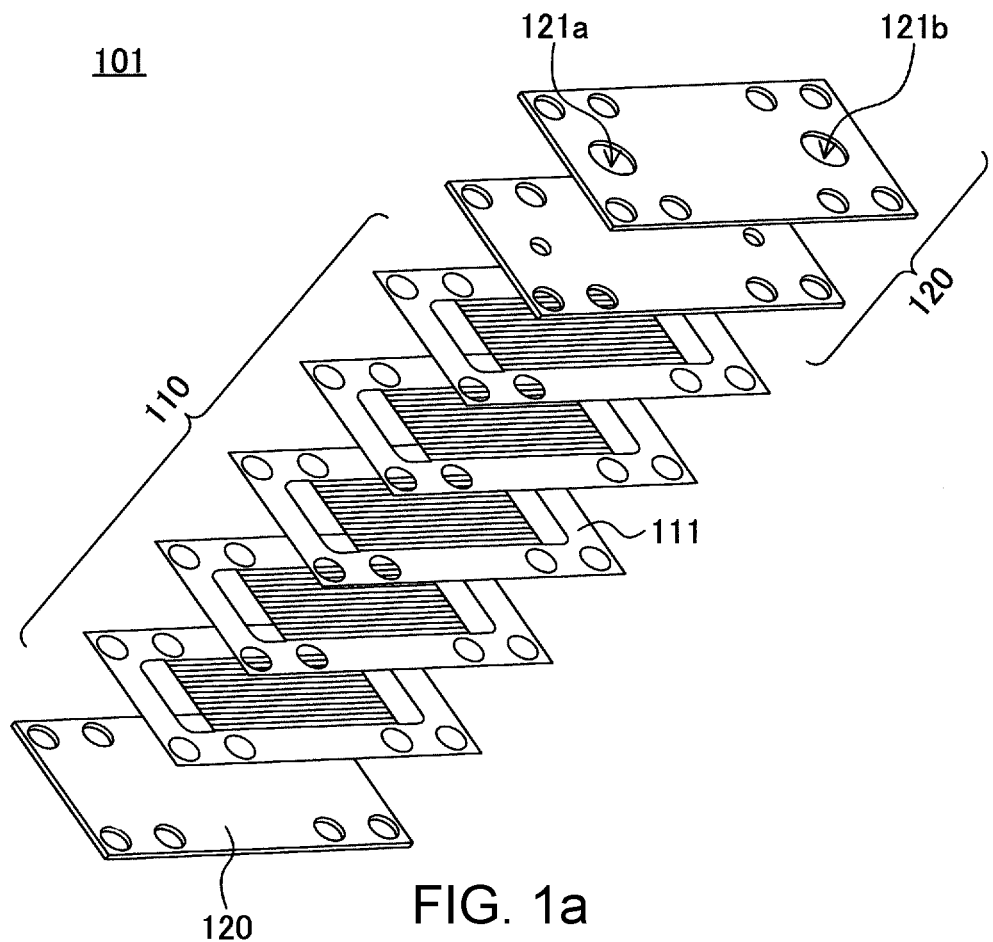
FIG. 1a is a schematic view for showing a configuration of a bypass unit an according to a Working Example 1 of the present invention (Working Example 1 bypass unit).

As mentioned above, in the art, a demand exists for a new technology which makes it possible to form a bypass flow passage with high accuracy of dimension while suppressing increase in a manufacturing cost still exists.

On the other hand, there is also a problem that a process for assembling a bypass according to a conventional technology (which may be referred to as a "conventional bypass" hereinafter) as a flow meter or a flow controller is complicated. For example, in an assembling process of a flow meter, it is necessary to house a bypass in a housing part formed in a base for a flow meter and airtightly connect an inlet passage for flowing fluid into a bypass flow passage and an outlet passage for flowing the fluid out of the bypass flow passage with the bypass flow passage, in any conventional bypasses.

Furthermore, it is necessary to airtightly connect a sensor tube for a thermal type flow rate sensor and a pressure sensor for a differential pressure type flow rate sensor with a flow passage on an upstream side and a downstream side of a bypass, respectively. In addition to the above, in an assembling process of a flow controller, it is necessary to airtightly connect a flow control valve for changing a flow rate of fluid which flows through a flow passage with the flow passage on an upstream side or a downstream side of a flow meter. In the present specification, the term "airtightly" refers to a "state that a plurality of members is joined without any aperture (gap) and fluid does not leak out from between these members" etc., for example.

In order to airtightly connect various constituent members which constitute a flow meter or a flow controller with a conventional bypass as mentioned above, for example, it is necessary to form a branching of a flow passage and/or interpose a packing in the junction (connection) as needed in a base for a flow meter or a base for a flow controller. As a result, a process for assembling a conventional bypass into a flow meter or a flow controller becomes complicated.

Solution to Problem

The present invention has been conceived in view of the above-mentioned problem, and one of the objectives is to provide a technology which makes it possible to form a bypass flow passage with high accuracy of dimension and simplify a process for assembling a bypass into and a flow meter and/or a flow controller.

The present inventor has found that a bypass unit, a base for a flow meter, and a base for a flow controller, wherein a main flow passage, through which fluid that is a target for measurement of a flow rate flows, and a bypass which intervenes in the main flow passage are integrally formed inside thereof can be easily manufactured with high accuracy, by laminating laminar (sheet-like) members in which a groove constitutes a bypass flow passage and through-holes communicated with the groove are formed, as a result of wholehearted research. Furthermore, the present inventor has found that a flow meter and/or a flow controller can be manufactured without complicating an assembling process, in accordance with such a bypass unit, a base for a flow meter, and a base for a flow controller.

Namely, a bypass unit according to the present invention (which may be referred to as the "present invention bypass unit" hereinafter) is a bypass unit comprising a bypass part that is a member having a shape of a plate, and a pair of external connection parts that is a pair of members having a shape of a plate and being laminated on two principal surfaces of the above-mentioned bypass part, respectively.

The above-mentioned bypass part comprises one first member that is a member having a shape of a sheet, in which a first inlet hole that is at least one through-hole having a predetermined size and a predetermined shape, a first outlet hole that is at least one through-hole having a predetermined size and a predetermined shape, and at least one groove in communication with the above-mentioned first inlet hole and the above-mentioned first outlet hole are formed, or said bypass part comprises two or more the above-mentioned first members laminated such that the above-mentioned first inlet holes of the above-mentioned first members adjacent to each other airtightly communicate with each other and the above-mentioned first outlet holes of the above-mentioned first members adjacent to each other airtightly communicate with each other.

A second inlet hole that is at least one through-hole having a predetermined size and a predetermined shape is formed in either of the above-mentioned pair of the above-mentioned external connection parts, and a second outlet hole that is at least one through-hole having a predetermined size and a predetermined shape is formed in either of the above-mentioned pair of the above-mentioned external connection parts.

Furthermore, the above-mentioned first inlet hole formed in the above-mentioned first member and the above-mentioned second inlet hole formed in the above-mentioned external connection part are configured to airtightly communicate with each other, and the above-mentioned first outlet hole formed in the above-mentioned first member and the above-mentioned second outlet hole formed in the above-mentioned external connection part are configured to airtightly communicate with each other.

Advantageous Effects of Invention

As mentioned above, in the present invention bypass unit, a bypass flow passage can be constituted by the groove formed in the first member. Therefore, for example, as compared with a conventional bypass wherein a bypass flow passage is constituted by a plurality of capillary tubes bundled in parallel with each other or a laminated object of a predetermined number of sheets (etching plates) in which many fine pores having an identical shape and layout, a bypass flow passage can be more easily formed with higher accuracy.

Furthermore, in the present invention bypass unit, the bypass flow passage is demarcated by faces (a bottom face and side faces) constituting the groove formed in the first member and a portion airtightly closing an aperture plane of the groove among the principal surfaces of the external connection part or another first member adjoining and facing the groove. In addition, the bypass flow passage, the first inlet hole and the second inlet hole as an inlet passage for introducing fluid from the outside into the bypass flow passage, and the first outlet hole and the second outlet hole as an outlet passage for outputting the fluid from the bypass flow passage to the outside are formed integrally.

Therefore, in accordance with the present invention bypass unit, without requiring a member constituting an inlet passage for introducing fluid from the outside into individual bypass flow passages which a bypass part comprises and an outlet passage for outputting the fluid from the individual bypass flow passages which a bypass part comprises to the outside (for example, a joint block etc.) and a member for attaining airtightness (for example, a packing etc.), a bypass part can be interposed in a main flow passage in a flow meter and a flow controller, for example. Namely, in accordance with the present invention bypass unit, an assembling process of a flow meter and/or a flow controller can be simplified.

In addition, as will be mentioned later in detail, effectiveness attained by the present invention bypass unit is similarly attained in a base for a flow meter, a base for a flow controller, a flow meter, and a flow controller, which comprise the present invention bypass unit.

Other objectives, other features, and accompanying advantages of the present invention will be easily understood from explanation of respective embodiments and respective Working Examples of the present invention, which will be described below.

First Embodiment

Hereinafter, a bypass unit according to a first embodiment of the present invention (which may be referred to as a "first bypass unit" hereinafter) will be explained. The first bypass unit is a bypass unit comprising a bypass part that is a member having a shape of a plate, and a pair of external connection parts that is a pair of members having a shape of a plate and being laminated on two principal surfaces of the above-mentioned bypass part, respectively.

The above-mentioned bypass part comprises one first member that is a member having a shape of a sheet, in which a first inlet hole that is at least one through-hole having a predetermined size and a predetermined shape, a first outlet hole that is at least one through-hole having a predetermined size and a predetermined shape, and at least one groove in communication with the above-mentioned first inlet hole and the above-mentioned first outlet hole are formed, or the above-mentioned bypass part comprises two or more the above-mentioned first members laminated such that the above-mentioned first inlet holes of the above-mentioned first members adjacent to each other airtightly communicate with each other and the above-mentioned first outlet holes of the above-mentioned first members adjacent to each other airtightly communicate with each other.

A second inlet hole that is at least one through-hole having a predetermined size and a predetermined shape is formed in either of the above-mentioned pair of the above-mentioned external connection parts, and a second outlet hole that is at least one through-hole having a predetermined size and a predetermined shape is formed in either of the above-mentioned pair of the above-mentioned external connection parts.

Furthermore, the above-mentioned first inlet hole formed in the above-mentioned first member and the above-mentioned second inlet hole formed in the above-mentioned external connection part are configured to airtightly communicate with each other, and the above-mentioned first outlet hole formed in the above-mentioned first member and the above-mentioned second outlet hole formed in the above-mentioned external connection part are configured to airtightly communicate with each other.

As mentioned above, in the first bypass unit, a bypass flow passage can be constituted by the groove formed in the first member. Therefore, for example, as compared with a conventional bypass wherein a bypass flow passage is constituted by a plurality of capillary tubes bundled in parallel with each other or a laminated object of a predetermined number of sheets (etching plates) in which many fine pores having an identical shape and layout, a bypass flow passage can be more easily formed with higher accuracy.

Furthermore, in the first bypass unit, the bypass flow passage is demarcated by faces (a bottom face and side faces) constituting the groove formed in the first member and a portion airtightly closing an aperture plane of the groove among the principal surfaces of the external connection part or another first member adjoining and facing the groove. In addition, the bypass flow passage, the first inlet hole and the second inlet hole as an inlet passage for introducing fluid from the outside into the bypass flow passage, and the first outlet hole and the second outlet hole as an outlet passage for outputting the fluid from the bypass flow passage to the outside are formed integrally.

Therefore, in accordance with the first bypass unit, without requiring a member constituting an inlet passage for introducing fluid from the outside into individual bypass flow passages which a bypass part comprises and an outlet passage for outputting the fluid from the individual bypass flow passages which a bypass part comprises to the outside (for example, a joint block etc.) and a member for attaining airtightness (for example, a packing etc.), a bypass part can be interposed in a main flow passage in a flow meter and a flow controller, for example. Namely, in accordance with the first bypass unit, an assembling process of a flow meter and/or a flow controller can be simplified.

Second Embodiment

Hereinafter, a bypass unit according to a second embodiment of the present invention (which may be referred to as a "second bypass unit" hereinafter) will be explained. The second bypass unit has the same configuration as the above-mentioned first bypass unit, except points listed in the following (1) to (6).

(1) The above-mentioned first member is constituted as a laminated object in which a second member that is one member having a shape of a sheet and a third member that is one member having a shape of a sheet are laminated.

(2) A third inlet hole that is at least one through-hole having a predetermined size and a predetermined shape, a third outlet hole which is at least one through-hole which has a predetermined size and a predetermined shape, and a slit that is at least one through-hole having a predetermined width and a predetermined length are formed in the above-mentioned second member.

(3) A fourth inlet hole that is at least one through-hole having a predetermined size and a predetermined shape and a fourth outlet hole which is at least one through-hole which has a predetermined size and a predetermined shape are formed in the above-mentioned third member.

(4) The above-mentioned third inlet hole of the above-mentioned second member and the above-mentioned fourth inlet hole of the above-mentioned third member airtightly communicate with each other to form the above-mentioned first inlet hole in the above-mentioned first member, and the above-mentioned third outlet hole of the above-mentioned second member and the above-mentioned fourth outlet hole of the above-mentioned third member airtightly communicate with each other to form the above-mentioned first outlet hole in the above-mentioned first member.

(5) An inlet end that is an end closer to the above-mentioned third inlet hole among both ends of the above-mentioned slit and the above-mentioned third inlet hole are configured to airtightly communicate with each other through the above-mentioned fourth inlet hole, and an outlet end that is an end closer to the above-mentioned third outlet hole among both ends of the above-mentioned slit and the above-mentioned third outlet hole are configured to airtightly communicate with each other through the above-mentioned fourth outlet hole.

(6) An aperture plane other than the above-mentioned inlet end and the above-mentioned outlet end of the above-mentioned slit formed in the above-mentioned second member is airtightly closed with a portion of the above-mentioned third member where the above-mentioned fourth inlet hole and the above-mentioned fourth outlet hole are not formed to form the above-mentioned groove in the above-mentioned first member.

When directly forming a groove in the above-mentioned first member, it is necessary to adjust the depth of the groove in a predetermined depth by adjusting the extent of an etching processing, etc., for example. On the other hand, in the second member, a slit can be formed by forming a through-hole corresponding to the shape of the slit in the sheet-like second member, for example, with a technique, such as punching, cutting, and an etching. Therefore, the depth of the groove formed by laminating the second member and the third member is uniquely determined by a thickness of the second member. Namely, as compared with the case where a groove is formed directly in the first member, a groove can be formed with higher processing accuracy.

Third Embodiment

Hereinafter, a bypass unit according to a third embodiment of the present invention (which may be referred to as a "third bypass unit" hereinafter) will be explained. The third bypass unit has the same configuration as the above-mentioned second bypass unit, except points listed in the following (1) and (2).

(1) In a parallel-projected projection view projected to a plane parallel to the above-mentioned principal surface of the above-mentioned bypass part, the above-mentioned fourth inlet hole is formed to overlap with at least a part of the above-mentioned third inlet hole and the above-mentioned inlet end.

(2) In the parallel-projected projection view projected to the plane parallel to the above-mentioned principal surface of the above-mentioned bypass part, the above-mentioned fourth outlet hole is formed to overlap with at least a part of the above-mentioned third outlet hole and the above-mentioned outlet end.

Thereby, one end (inlet end) of the slit can be made communicate airtightly with the first inlet hole as the inlet passage constituted by the third inlet hole and the fourth inlet hole adjacent to each other, and the other end (outlet end) of the slit can be made communicate airtightly with the first outlet hole as the outlet passage constituted by the third outlet hole and the fourth outlet hole adjacent to each other. Namely, without requiring a particular processing and/or member, the bypass flow passage, the inlet passage for introducing fluid into the bypass flow passage from the outside, and the outlet passage for outputting the fluid from the bypass flow passage to the outside can be formed integrally.

Fourth Embodiment

Hereinafter, a bypass unit according to a fourth embodiment of the present invention (which may be referred to as a "fourth bypass unit" hereinafter) will be explained. The shape of the groove formed in the first member which the above-mentioned first to third bypass units comprise is not limited in particular unless a function as a laminar flow element and/or a differential pressure generating means is spoiled.

On the other hand, in the fourth bypass unit, in a parallel-projected projection view projected to a plane parallel to the above-mentioned principal surface of the above-mentioned bypass part, the above-mentioned groove is formed linearly. Alternatively, in a parallel-projected projection view projected to a plane parallel to the above-mentioned principal surface of the above-mentioned bypass part, the above-mentioned groove is formed vortically.

Thereby, it becomes easy to design a size and shape of the fourth bypass unit according to a space for housing the fourth bypass unit in a device in which the fourth bypass unit is incorporated (for example, a flow meter, a flow controller, etc.), for example.

Fifth Embodiment

Hereinafter, a bypass unit according to a fifth embodiment of the present invention (which may be referred to as a "fifth bypass unit" hereinafter) will be explained. The fifth bypass unit has the same configuration as the above-mentioned first to fourth bypass units, except the following point.

The fifth bypass unit further comprises:

an inlet piping connecting structure that is a structure for fixing an inlet piping, which introduces fluid from the outside, to the above-mentioned bypass unit such that the above-mentioned inlet piping and the above-mentioned second inlet hole airtightly communicate with each other, and an outlet piping connecting structure that is a structure for fixing an outlet piping, which outputs fluid to the outside, to the above-mentioned bypass unit such that the above-mentioned outlet piping and the above-mentioned second outlet hole airtightly communicate with each other.

In accordance with the above-mentioned configuration, without requiring a particular jig or tool etc., the inlet piping and the second inlet hole can be fixed by the inlet piping connecting structure such that they communicate airtightly with each other. Similarly, in accordance with the above-mentioned configuration, without requiring a particular jig or tool etc., the outlet piping and the second outlet hole can be fixed by the outlet piping connecting structure such that they communicate airtightly with each other. Namely, in accordance with the above-mentioned configuration, a process for interposing the present invention bypass unit in a main flow passage of fluid in a flow meter and/or a flow controller (assembling process of a flow meter and/or a flow controller) can be further simplified.

Sixth Embodiment

Hereinafter, a base for a flow meter according to a sixth embodiment of the present invention (which may be referred to as a "sixth base for a flow meter" hereinafter) will be explained. The sixth base for a flow meter is a base for assembling a flow meter, and is a base for a flow meter comprising the present invention bypass unit including the above-mentioned first to fifth bypass units.

In the sixth base for a flow meter, an inlet side branch hole that is at least one through-hole having a predetermined size and a predetermined shape and airtightly communicating with the above-mentioned first inlet hole is further formed in either of the above-mentioned pair of the above-mentioned external connection parts, and an outlet side branch hole that is at least one through-hole having a predetermined size and a predetermined shape and airtightly communicating with the above-mentioned first outlet hole is further formed in either of the above-mentioned pair of the above-mentioned external connection parts.

In accordance with this, a thermal type flow meter can be easily constituted by fixing a sensor tube to the sixth base for a flow meter such that the inlet side branch hole and the outlet side branch hole airtightly communicate with each other through the inside of the sensor tube, for example. Alternatively, a differential pressure type flow meter can be easily constituted by fixing an upstream side pressure sensor to the sixth base for a flow meter such that a detection part of the upstream side pressure sensor exposes to a space airtightly communicating with the inlet side branch hole and fixing a downstream side pressure sensor to the sixth base for a flow meter such that a detection part of the downstream side pressure sensor exposes to a space airtightly communicating with the outlet side branch hole.

Seventh Embodiment

Hereinafter, a base for a flow meter according to a seventh embodiment of the present invention (which may be referred to as a "seventh base for a flow meter" hereinafter) will be explained. The seventh base for a flow meter has the same configuration as the above-mentioned sixth base for a flow meter, except the following point.

The seventh base for a flow meter further comprises a branch connecting structure that is a structure for fixing a fourth member that is a separate member, which has an internal space, to the above-mentioned base for a flow meter such that the above-mentioned inlet side branch hole and/or the above-mentioned outlet side branch hole airtightly communicate with the above-mentioned internal space.

For example, when a thermal type flow meter is constituted using the seventh base for a flow meter, the fourth member is a sensor tube. Moreover, when a differential pressure type flow meter is constituted using the seventh base for a flow meter, the fourth member is an upstream side pressure sensor and a downstream side pressure sensor. In both cases, in accordance with the above-mentioned configuration, without requiring a particular jig or tool etc., the fourth member that is a separate member which has an internal space can be fixed to the seventh base for a flow meter by the branch connecting structure, such that the inlet side branch hole and/or the outlet side branch hole airtightly communicate with the internal space. Namely, an assembling process of a flow meter and/or a flow controller can be further simplified.

Eighth Embodiment

Hereinafter, a base for a flow controller according to an eighth embodiment of the present invention (which may be referred to as an "eighth base for a flow controller" hereinafter) will be explained. The eighth base for a flow controller is a base for assembling a flow controller, and is a base for a flow controller comprising the present invention base for a flow meter including the above-mentioned sixth and seventh bases for a flow meter.

In the eighth base for a flow controller, a fifth inlet hole that is at least one through-hole having a predetermined size and a predetermined shape is further formed in either of the above-mentioned pair of the above-mentioned external connection parts, and a fifth outlet hole that is at least one through-hole having a predetermined size and a predetermined shape is further formed in either of the above-mentioned pair of the above-mentioned external connection parts. In addition, an independent flow passage that is a flow passage which makes the above-mentioned fifth inlet hole and the above-mentioned fifth outlet hole airtightly communicate with each other and does not communicate with the above-mentioned groove is further formed in at least one of the above-mentioned first member.

In accordance with this, a thermal type flow meter can be easily constituted by fixing a sensor tube to the eighth base for a flow controller such that the inlet side branch hole and the outlet side branch hole airtightly communicate with each other through the inside of the sensor tube, for example. Alternatively, a differential pressure type flow meter can be easily constituted by fixing an upstream side pressure sensor to the eighth base for a flow controller such that a detection part of the upstream side pressure sensor exposes to a space airtightly communicating with the inlet side branch hole and fixing a downstream side pressure sensor to the eighth base for a flow controller such that a detection part of the downstream side pressure sensor exposes to a space airtightly communicating with the outlet side branch hole.

In addition, a flow controller which brings a flow rate of fluid close to a predetermined target value can be easily constituted by fixing a flow control valve to the eighth base for a flow controller such that the second outlet hole and the fifth inlet hole airtightly communicate with each other through the flow control valve and preparing a control part which controls an actuator based on a detection value acquired by the above-mentioned thermal type flow meter or the above-mentioned differential pressure type flow meter to adjust an opening of the flow control valve.

Ninth Embodiment

Hereinafter, a base for a flow controller according to a ninth embodiment of the present invention (which may be referred to as a "ninth base for a flow controller" hereinafter) will be explained. The ninth base for a flow controller has the same configuration as the above-mentioned eighth base for a flow controller, except the following point.

The ninth base for a flow controller further comprises a valve connecting structure that is a structure for fixing a flow control valve to the above-mentioned base for a flow controller such that the above-mentioned second outlet hole and the above-mentioned fifth inlet hole airtightly communicate with each other through the above-mentioned flow control valve.

In accordance with the above-mentioned configuration, without requiring a particular jig or tool etc., the flow control valve can be fixed to the ninth base for a flow controller by the valve connecting structure such that the second outlet hole and the fifth inlet hole airtightly communicate with each other through the flow control valve. Namely, an assembling process of a flow controller can be further simplified.

Tenth Embodiment

Hereinafter, a thermal type flow meter according to a tenth embodiment of the present invention (which may be referred to as a "tenth thermal type flow meter" hereinafter) will be explained. The tenth thermal type flow meter is a thermal type flow meter which comprises the present invention base for a flow meter including the sixth and seventh bases for a flow meter, a sensor tube, and a pair of sensor wires wound around the above-mentioned sensor tube, and acquires a detection value corresponding to a flow rate of fluid flowing into the inside of the above-mentioned sensor tube through the above-mentioned inlet side branch hole and flowing out of the inside of the above-mentioned sensor tube through the above-mentioned outlet side branch hole, based on a difference in electric-resistance value between the above-mentioned pair of the above-mentioned sensor wires.

Furthermore, the above-mentioned sensor tube is fixed to the above-mentioned base for a flow meter such that the above-mentioned inlet side branch hole and the above-mentioned outlet side branch hole airtightly communicate with each other through the inside of the above-mentioned sensor tube.

Since the tenth thermal type flow meter is assembled using the present invention base for a flow meter as mentioned above, the tenth thermal type flow meter can be easily constituted by fixing the sensor tube to the present invention base for a flow meter such that the inlet side branch hole and the outlet side branch hole airtightly communicate with each other through the inside of the sensor tube. Namely, the tenth thermal type flow meter can be manufactured by a simplified assembling process.

Eleventh Embodiment

Hereinafter, a thermal type flow meter according to an eleventh embodiment of the present invention (which may be referred to as an "eleventh thermal type flow meter" hereinafter) will be explained. The eleventh thermal type flow meter has the same configuration as the above-mentioned tenth thermal type flow meter, except the following point.

The eleventh thermal type flow meter is configured as a thermal type flow meter which comprises the above-mentioned seventh base for a flow meter, a sensor tube as the above-mentioned fourth member, and a pair of sensor wires wound around the above-mentioned sensor tube, and acquires a detection value corresponding to a flow rate of fluid flowing into the inside of the above-mentioned sensor tube through the above-mentioned inlet side branch hole and flowing out of the inside of the above-mentioned sensor tube through the above-mentioned outlet side branch hole, based on a difference in electric-resistance value between the above-mentioned pair of the above-mentioned sensor wires. Furthermore, the above-mentioned sensor tube is fixed to the above-mentioned base for a flow meter by the above-mentioned branch connecting structure such that the above-mentioned inlet side branch hole and the above-mentioned outlet side branch hole airtightly communicate with each other through the inside of the above-mentioned sensor tube.

In accordance with the above-mentioned configuration, without requiring a particular jig or tool etc., the sensor tube can be fixed to the present invention base for a flow meter by the branch connecting structure such that the inlet side branch hole and the outlet side branch hole airtightly communicate with each other through the inside of the sensor tube as the fourth member. Namely, the eleventh thermal type flow meter which has the above-mentioned configuration can be manufactured by a further simplified assembling process.

Twelfth Embodiment

Hereinafter, a differential pressure type flow meter according to a twelfth embodiment of the present invention (which may be referred to as a "twelfth differential pressure type flow meter" hereinafter) will be explained. The twelfth differential pressure type flow meter is a differential pressure type flow meter which comprises the present invention base for a flow meter including the above-mentioned sixth and seventh bases for a flow meter, an upstream side pressure sensor, and a downstream side pressure sensor, and acquires a detection value corresponding to a flow rate of fluid flowing in from the above-mentioned first inlet hole, flowing through the above-mentioned groove of the above-mentioned bypass part and flowing out from the above-mentioned first outlet hole, based on a difference in pressure detected by the above-mentioned upstream side pressure sensor and the above-mentioned downstream side pressure sensor.

The above-mentioned upstream side pressure sensor is fixed to the above-mentioned base for a flow meter such that a detection part of the above-mentioned upstream side pressure sensor exposes to a space airtightly communicating with the above-mentioned inlet side branch hole, and the above-mentioned downstream side pressure sensor is fixed to the above-mentioned base for a flow meter such that a detection part of the above-mentioned downstream side pressure sensor exposes to a space airtightly communicating with the above-mentioned outlet side branch hole.

Since the twelfth differential pressure type flow meter is assembled using the present invention base for a flow meter as mentioned above, the twelfth differential pressure type flow meter can be easily constituted by fixing the upstream side pressure sensor to the present invention base for a flow meter such that the detection part of the upstream side pressure sensor exposes to the space airtightly communicating with the inlet side branch hole and fixing the downstream side pressure sensor to the present invention base for a flow meter such that the detection part of the downstream side pressure sensor exposes to the space airtightly communicating with the outlet side branch hole. Namely, the twelfth differential pressure type flow meter can be manufactured by a simplified assembling process.

Thirteenth Embodiment

Hereinafter, a differential pressure type flow meter according to a thirteenth embodiment of the present invention (which may be referred to as a "thirteenth differential pressure type flow meter" hereinafter) will be explained. The thirteenth differential pressure type flow meter has the same configuration as the above-mentioned twelfth differential pressure type flow meter, except the following point.

The thirteenth differential pressure type flow meter is configured as a differential pressure type flow meter which comprises the above-mentioned seventh base for a flow meter, an upstream side pressure sensor as the above-mentioned fourth member, and a downstream side pressure sensor as the above-mentioned fourth member, and acquires a detection value corresponding to a flow rate of fluid flowing in from the above-mentioned first inlet hole, flowing through the above-mentioned groove of the above-mentioned bypass part and flowing out from the above-mentioned first outlet hole, based on a difference in pressure detected by the above-mentioned upstream side pressure sensor and the above-mentioned downstream side pressure sensor.

Furthermore, the above-mentioned upstream side pressure sensor is fixed to the above-mentioned base for a flow meter by the above-mentioned branch connecting structure such that a detection part of the above-mentioned upstream side pressure sensor exposes to a space airtightly communicating with the above-mentioned inlet side branch hole. Similarly, the above-mentioned downstream side pressure sensor is fixed to the above-mentioned base for a flow meter by the above-mentioned branch connecting structure such that a detection part of the above-mentioned downstream side pressure sensor exposes to a space airtightly communicating with the above-mentioned outlet side branch hole.

In accordance with the above-mentioned configuration, without requiring a particular jig or tool etc., the upstream side pressure sensor can be fixed to the present invention base for a flow meter by the branch connecting structure such that the detection part of the upstream side pressure sensor as the fourth member exposes to the space airtightly communicating with the inlet side branch hole. Similarly, in accordance with the above-mentioned configuration, without requiring a particular jig or tool etc., the downstream side pressure sensor can be fixed to the present invention base for a flow meter by the branch connecting structure such that the detection part of the downstream side pressure sensor as the fourth member exposes to the space airtightly communicating with the outlet side branch hole. Namely, the thirteenth differential pressure type flow meter which has the above-mentioned configuration can be manufactured by a further simplified assembling process.

Fourteenth Embodiment

Hereinafter, a thermal type flow controller according to a fourteenth embodiment of the present invention (which may be referred to as a "fourteenth thermal type flow controller"

hereinafter) will be explained. The fourteenth thermal type flow controller comprises a thermal type flow meter, a flow control valve, an actuator configured to adjust an opening of the above-mentioned flow control valve, and a control part. Furthermore, the above-mentioned control part is configured to bring a flow rate of fluid flowing into the inside of the above-mentioned sensor tube through the above-mentioned inlet side branch hole and flowing out of the inside of the above-mentioned sensor tube through the above-mentioned outlet side branch hole close to a predetermined target value by controlling the above-mentioned actuator based on a detection value acquired by the above-mentioned thermal type flow meter to adjust the opening of the above-mentioned flow control valve. Thereby, the fourteenth thermal type flow controller can bring the flow rate of the fluid flowing in from the above-mentioned first inlet hole, flowing through the above-mentioned groove of the above-mentioned bypass part and flowing out from the above-mentioned first outlet hole close to the predetermined target value.

The above-mentioned thermal type flow meter comprises the present invention base for a flow controller including the above-mentioned eighth and ninth bases for a flow controller, a sensor tube, and a pair of sensor wires wound around the above-mentioned sensor tube, and is configured to acquire a detection value corresponding to the above-mentioned flow rate of the above-mentioned fluid, based on a difference in electric-resistance value between the above-mentioned pair of the above-mentioned sensor wires.

Furthermore, the above-mentioned sensor tube is fixed to the above-mentioned base for a flow controller such that the above-mentioned inlet side branch hole and the above-mentioned outlet side branch hole airtightly communicate with each other through the inside of the above-mentioned sensor tube, and the above-mentioned flow control valve is fixed to the above-mentioned base for a flow controller such that the above-mentioned second outlet hole and the above-mentioned fifth inlet hole airtightly communicate with each other through the above-mentioned flow control valve.

Since the fourteenth thermal type flow controller is assembled using the present invention base for a flow controller as mentioned above, the fourteenth thermal type flow controller can be easily constituted by fixing the sensor tube to the present invention base for a flow controller such that the inlet side branch hole and the outlet side branch hole airtightly communicate with each other through the inside of the sensor tube and fixing the flow control valve to the present invention base for a flow controller such that the second outlet hole and the fifth inlet hole airtightly communicate with each other through the flow control valve. Namely, the fourteenth thermal type flow controller can be manufactured by a simplified assembling process.

Fifteenth Embodiment

Hereinafter, a thermal type flow controller according to a fifteenth embodiment of the present invention (which may be referred to as a "fifteenth thermal type flow controller" hereinafter) will be explained. The fifteenth thermal type flow controller has the same configuration as the above-mentioned fourteenth thermal type flow controller, except the following point.

The above-mentioned thermal type flow meter, which the fifteenth thermal type flow controller comprises, comprises the above-mentioned ninth base for a flow controller, a sensor tube as the above-mentioned fourth member, and a pair of sensor wires wound around the above-mentioned sensor tube. Furthermore, this thermal type flow meter is configured to acquire a detection value corresponding to a flow rate of fluid flowing into the inside of the above-mentioned sensor tube through the above-mentioned inlet side branch hole and flowing out of the inside of the above-mentioned sensor tube through the above-mentioned outlet side branch hole, based on a difference in electric-resistance value between the above-mentioned pair of the above-mentioned sensor wires.

Also in this case, the above-mentioned control part is configured to bring the above-mentioned flow rate of the above-mentioned fluid close to a predetermined target value by controlling the above-mentioned actuator based on the above-mentioned detection value acquired by the above-mentioned thermal type flow meter to adjust the above-mentioned opening of the above-mentioned flow control valve.

However, in this case, the above-mentioned sensor tube is fixed to the above-mentioned base for a flow controller by the above-mentioned branch connecting structure such that the above-mentioned inlet side branch hole and the above-mentioned outlet side branch hole airtightly communicate with each other through the inside of the above-mentioned sensor tube. Furthermore, the above-mentioned flow control valve is fixed to the above-mentioned base for a flow controller by the above-mentioned valve connecting structure such that the above-mentioned second outlet hole and the above-mentioned fifth inlet hole airtightly communicate with each other through the above-mentioned flow control valve.

In accordance with the above-mentioned configuration, without requiring a particular jig or tool etc., the sensor tube can be fixed to the present invention base for a flow controller by the branch connecting structure such that the inlet side branch hole and the outlet side branch hole airtightly communicate with each other through the inside of the sensor tube as the fourth member. Furthermore, in accordance with the above-mentioned configuration, without requiring a particular jig or tool etc., the flow control valve can be fixed to the present invention base for a flow controller by the valve connecting structure such that the second outlet hole and the fifth inlet hole airtightly communicate with each other through the flow control valve. Namely, the fifteenth thermal type flow controller which has the above-mentioned configuration can be manufactured by a further simplified assembling process.

Sixteenth Embodiment

Hereinafter, a differential pressure type flow controller according to a sixteenth embodiment of the present invention (which may be referred to as a "sixteenth differential pressure type flow controller" hereinafter) will be explained. The sixteenth differential pressure type flow controller comprises a differential pressure type flow meter, a flow control valve, an actuator configured to adjust an opening of the above-mentioned flow control valve, and a control part. Furthermore, the above-mentioned control part is configured to bring a flow rate of fluid close to a predetermined target value by controlling the above-mentioned actuator based on a detection value acquired by the above-mentioned differential pressure type flow meter to adjust the opening of the above-mentioned flow control valve.

However, the above-mentioned differential pressure type flow meter comprises the present invention base for a flow controller including the above-mentioned eighth and ninth bases for a flow controller, an upstream side pressure sensor, and a downstream side pressure sensor, and is configured to acquire a detection value corresponding to a flow rate of fluid flowing in from the above-mentioned first inlet hole, flowing through the above-mentioned groove of the above-mentioned bypass part and flowing out from the above-mentioned first outlet hole, based on a difference in pressure detected by the above-mentioned upstream side pressure sensor and the above-mentioned downstream side pressure sensor.

Furthermore, the above-mentioned upstream side pressure sensor is fixed to the above-mentioned base for a flow controller such that a detection part of the above-mentioned upstream side pressure sensor exposes to a space airtightly communicating with the above-mentioned inlet side branch hole, and the above-mentioned downstream side pressure sensor is fixed to the above-mentioned base for a flow controller such that a detection part of the above-mentioned downstream side pressure sensor exposes to a space airtightly communicating with the above-mentioned outlet side branch hole. In addition, the above-mentioned flow control valve is fixed to the above-mentioned base for a flow controller such that the above-mentioned second outlet hole and the above-mentioned fifth inlet hole airtightly communicate with each other through the above-mentioned flow control valve.

Since the sixteenth differential pressure type flow controller is assembled using the present invention base for a flow controller as mentioned above, the sixteenth differential pressure type flow controller can be easily constituted by fixing the upstream side pressure sensor to the present invention base for a flow controller such that the detection part of the upstream side pressure sensor exposes to the space airtightly communicating with the inlet side branch hole, fixing the downstream side pressure sensor the present invention base for a flow controller such that the detection part of the downstream side pressure sensor exposes to the space airtightly communicating with the outlet side branch hole, and fixing the flow control valve to the present invention base for a flow controller such that the second outlet hole and the fifth inlet hole airtightly communicate with each other through the flow control valve. Namely, the sixteenth differential pressure type flow controller can be manufactured by a simplified assembling process.

Seventeenth Embodiment

Hereinafter, a differential pressure type flow controller according to a seventeenth embodiment of the present invention (which may be referred to as a "seventeenth differential pressure type flow controller" hereinafter) will be explained. The seventeenth differential pressure type flow controller has the same configuration as the above-mentioned sixteenth differential pressure type flow controller, except the following point.

The above-mentioned differential pressure type flow meter, which the seventeenth differential pressure type flow controller comprises, comprises the above-mentioned ninth base for a flow controller that is the present invention base for a flow controller having the above-mentioned branch connecting structure and valve connecting structure, an upstream side pressure sensor as the above-mentioned fourth member, and a downstream side pressure sensor as the above-mentioned fourth member. Furthermore, this differential pressure type flow meter is configured to acquire a detection value corresponding to a flow rate of fluid flowing in from the above-mentioned first inlet hole, flowing through the above-mentioned groove of the above-mentioned bypass part and flowing out from the above-mentioned first outlet hole, based on a difference in pressure detected by the above-mentioned upstream side pressure sensor and the above-mentioned downstream side pressure sensor.

Also in this case, the above-mentioned control part is configured to bring the above-mentioned flow rate of the above-mentioned fluid close to a predetermined target value by controlling the above-mentioned actuator based on the above-mentioned detection value acquired by the above-mentioned differential pressure type flow meter to adjust the above-mentioned opening of the above-mentioned flow control valve.

However, in this case, the above-mentioned upstream side pressure sensor is fixed to the above-mentioned base for a flow controller by the above-mentioned branch connecting structure such that a detection part of the above-mentioned upstream side pressure sensor exposes to a space airtightly communicating with the above-mentioned inlet side branch hole, and the above-mentioned downstream side pressure sensor is fixed to the above-mentioned base for a flow controller such that a detection part of the above-mentioned downstream side pressure sensor exposes to a space airtightly communicating with the above-mentioned outlet side branch hole. Furthermore, the above-mentioned flow control valve is fixed to the above-mentioned base for a flow controller by the above-mentioned valve connecting structure such that the above-mentioned second outlet hole and the above-mentioned fifth inlet hole airtightly communicate with each other through the above-mentioned flow control valve.

In accordance with the above-mentioned configuration, without requiring a particular jig or tool etc., the upstream side pressure sensor can be fixed to the present invention base for a flow controller by the branch connecting structure such that the detection part of the upstream side pressure sensor as the fourth member exposes to the space airtightly communicating with the inlet side branch hole. Similarly, in accordance with the above-mentioned configuration, without requiring a particular jig or tool etc., the downstream side pressure sensor can be fixed to the present invention base for a flow controller by the branch connecting structure such that the detection part of the downstream side pressure sensor as the fourth member exposes to the space airtightly communicating with the outlet side branch hole.

Furthermore, in accordance with the above-mentioned configuration, without requiring a particular jig or tool etc., the flow control valve can be fixed to the present invention base for a flow controller by the valve connecting structure such that the second outlet hole and the fifth inlet hole airtightly communicate with each other through the flow control valve. Namely, the seventeenth differential pressure type flow controller which has the above-mentioned configuration can be manufactured by a further simplified assembling process.

By the way, special materials, such as a material whose content of an impurity is very low and a material with high corrosion resistance to fluid used, for example, may be required for a member which constitutes a bypass unit, a base for a flow meter, a base for a flow controller, a flow meter, and a flow controller, etc. As specific examples of such materials, ultra-low carbon steel, such as SUS316L (conforming to SEMI standards F-20), and a Ni—Cr—Mo alloy, such as HASTELLOY (registered trademark) C-22, etc. can be mentioned.

However, in some cases, an available form of special materials as mentioned above may be limited to a certain form (for example, a shape of a sheet, etc.). For example, it may be difficult to obtain such a material in a shape of a rod or block. As a result, it may be difficult to constitute a bypass unit according to a conventional technology etc. by a special material as mentioned above.

However, as mentioned above, the present invention bypass unit can be manufactured by laminating the first member that is a member in a shape of a sheet. Therefore, for example, even in a case where only a member in a shape of a sheet can be obtained as a special material as mentioned above, the present invention bypass unit can be constituted with the special material by manufacturing the first member from the member in a shape of a sheet (sheet-like member).

Namely, in accordance with the present invention bypass unit, even when an available form of its constituent member is limited, there is a low possibility that choice of a material may become narrow. The same applies to a base for a flow meter, a base for a flow controller, a flow meter, and a flow controller comprising the present invention bypass unit.

Although it is also possible to realize the same as the above also by powdered metallurgy which uses a 3D printer etc., for example, accuracy of dimension of a shaped product manufactured by powdered metallurgy is rough, and it is difficult to form a precise bypass unit.

Some Working Examples corresponding to some embodiments of the present invention will be explained in detail below.

Working Example 1

Hereinafter, a bypass unit according to a Working Example 1 of the present invention (which may be referred to as a "Working Example 1 bypass unit" hereinafter) will be explained.

Configuration

As shown in FIG. 1a, the Working Example 1 bypass unit 101 comprises a bypass part 110 that is a member having a shape of a plate, and a pair of external connection parts 120 that is a pair of members having a shape of a plate and being laminated on two principal surfaces of the bypass part 110, respectively.

The bypass part 110 in the Working Example 1 bypass unit 101 is constituted by a laminated object of five sheets of first members 111. However, the bypass part 110 does not necessarily need to be constituted by a laminated object of a plurality of sheets of the first members 111. Namely, the bypass part 110 may be constituted by one sheet of the first member 111.

Figure 2:
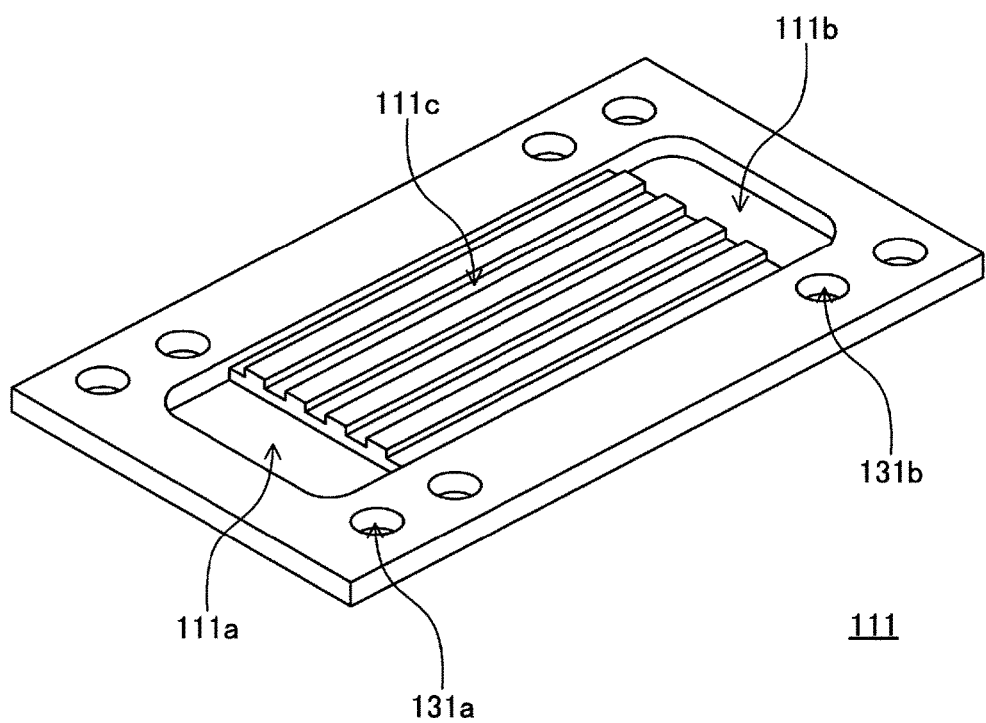
FIG. 2 is a schematic view for showing a configuration of a first member constituting a bypass part of the Working Example 1 bypass unit.

As shown in FIG. 2, the first member 111 is a member having a shape of a sheet, in which a first inlet hole 111a that is a through-hole having a predetermined size and an approximately quadrangular shape, a first outlet hole 111b that is a through-hole having a predetermined size and an approximately quadrangular shape, and five grooves in communication with the first inlet hole 111a and the first outlet hole 111b are formed. However, the size, shape and number of the first inlet hole 111a, the first outlet hole 111b and the groove 111c are not limited to the exemplification in FIG. 2.

In the laminated object of the first member 111 that constitutes the bypass part 110, the first members 111 are laminated such that the first inlet holes 111a of the first members 111 adjacent to each other airtightly communicate with each other and the first outlet holes 111b of the first members 111 adjacent to each other airtightly communicate with each other, as shown in FIG. 1a.

Moreover, in the Working Example 1 bypass unit 101, the bypass flow passage is demarcated by faces (a bottom face and side faces) constituting the groove 111c formed in the first member 111 and a portion airtightly closing an aperture plane of the groove 111c among the principal surfaces of the external connection part 120 or another first member 111 adjoining and facing the groove 111c.

On the other hand, in the Working Example 1 bypass unit 101, among the pair of the external connection parts 120, the upper external connection part 120 is constituted by a laminated object of two members in a shape of a sheet, and the lower external connection part 120 is constituted by one member in a shape of a sheet. However, the size, shape and number of a member which constitutes each of the pair of the external connection parts 120 are not limited to the exemplification in FIG. 1a.

Furthermore, a second inlet hole 121a and a second outlet hole 121b which are through-holes having a circular shape of a predetermined size are formed in the upper external connection part 120 among the pair of the external connection parts 120. On the other hand, the second inlet hole 121a and the second outlet hole 121b are not formed in the lower external connection part 120. However, the second inlet hole 121a and the second outlet hole 121b may be formed in either of the pair of the external connection parts 120, both of them may be formed in the external connection part 120 on one side, and they may be respectively formed in the external connection parts 120 on different sides. Moreover, the size, shape and number of the second inlet hole 121a and the second outlet hole 121b are not limited to the exemplification in FIG. 2.

In addition, the Working Example 1 bypass unit 101 is configured such that the first inlet hole 111a formed in the first member 111 and the second inlet hole 121a formed in the external connection part 120 airtightly communicate with each other and the first outlet hole 111b formed in the first member 111 and the second outlet hole 121b formed in the external connection part 120 airtightly communicate with each other.

Figure 1B:
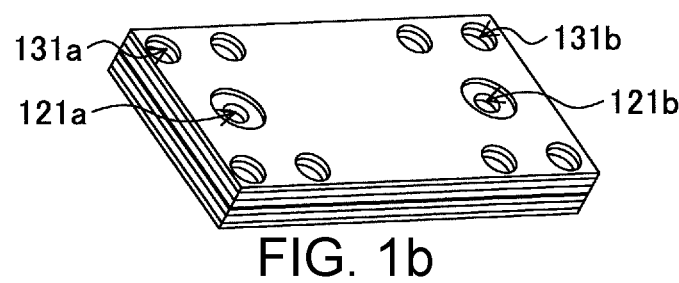
FIG. 1b is a perspective view seen from an upper surface (top surface) side of the Working Example 1.
Figure 1C:
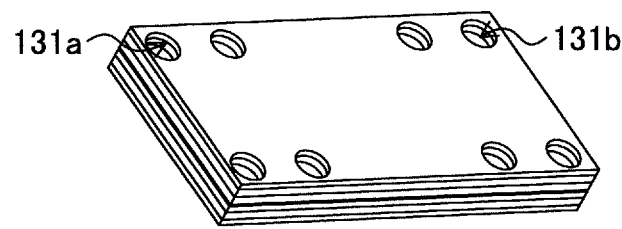
FIG. 1c is a perspective view seen from an under surface (bottom surface) side of the Working Example 1.

FIG. 1b is a perspective view seen from an upper surface (top surface) side of the Working Example 1 bypass unit 101, and FIG. 1c is a perspective view seen from an under surface (bottom surface) side of the Working Example 1 bypass unit 101. The Working Example 1 bypass unit 101 is a bypass unit in which an inlet hole (second inlet hole 121a) and an outlet hole (second outlet hole 121b) are formed on its top surface and a bypass flow passage (groove 111c) is formed in its inside.

In addition, the Working Example 1 bypass unit 101 shown in FIG. 1a further comprises an inlet piping connecting structure and an outlet piping connecting structure, although they are not essential constituent elements of a bypass unit according to the present invention.

Specifically, four through-holes 131a are formed in the external connection parts 120 shown in FIG. 1a and the first member 111 shown in FIG. 2 such that the four through-holes 131a surround the first inlet hole 111a and the second inlet hole 121a. Moreover, a level difference is formed in an aperture of the second inlet hole 121a due to a difference in the size between the second inlet holes 121a formed in two sheets of members which constitute the upper external connection part 120. These through-holes 131a and the level difference constitute the inlet piping connecting structure that is a structure for fixing an inlet piping (not shown), which introduces fluid from the outside, to the Working Example 1 bypass unit 101 such that the inlet piping and the second inlet hole 121a airtightly communicate with each other.

Similarly, four through-holes 131b are formed in the external connection parts 120 shown in FIG. 1a and the first members 111 shown in FIG. 2 such that they surround the first inlet hole 111b and the second inlet hole 121b. Moreover, a level difference is formed in an aperture of the second inlet hole 121b due to a difference in the size between the second inlet holes 121b formed in two sheets of members which constitute the upper external connection part 120. These through-holes 131b and the level difference constitute the outlet piping connecting structure that is a structure for fixing an outlet piping (not shown), which outputs fluid to the outside, to the Working Example 1 bypass unit 101 such that the outlet piping and the second outlet hole 121b airtightly communicate with each other.

In order to fix the inlet piping or outlet piping to the Working Example 1 bypass unit 101 using the above-mentioned inlet piping connecting structure or the outlet piping connecting structure, first, the inlet piping or the outlet piping is appressed against the Working Example 1 bypass unit 101 in a state where a packing is fitted in the above-mentioned level difference. Next, bolts are inserted into the through-holes 131a and through-holes prepared in (a flange of) the inlet piping. Alternatively, bolts are inserted into the through-hole 131b and through-holes prepared in (a flange of) the outlet piping. Finally, the bolts are fastened with nuts. Thereby, the inlet piping or the outlet piping can be fixed to the Working Example 1 bypass unit 101 in a state where a packing has been crushed and airtightness has been maintained.

However, the configurations of the inlet piping connecting structure and the outlet piping connecting structure are not limited to the exemplification in FIGS. 1a-1c and FIG. 2, either.

Manufacturing Method

Material of various constituent elements of the Working Example 1 bypass unit 101 which has the configuration as mentioned above is not limited in particular, and can be suitably chosen from materials which can bear an environment (for example, temperature, humidity and properties of fluid, etc.) where the Working Example 1 bypass unit 101 is used. Typically, the first member 111 and the external connection part 120 are formed of stainless steel.

Moreover, a specific technique for forming the first inlet hole 111a and the first outlet hole 111b, the second inlet hole 121a and the second outlet hole 121b, and the through-holes 131a and 131b is not especially limited, either and can be suitably chosen from various techniques, such as punching and cutting. Furthermore, a specific technique for forming the groove 111c is not especially limited, either. However, typically, the groove 111c which has a suitable width, length and depth can be formed by what is called a "half etching processing."

In addition, the joining technique of the laminated object in which the first members 111 and the external connection parts 120 are laminated is not especially limited, either, and can be suitably chosen from joining techniques which can bear the environment (for example, temperature, humidity and properties of fluid, etc.) where the Working Example 1 bypass unit 101 is used and can airtightly join the first members 111 and the external connection parts 120 with each other. As specific examples, a braze joining and a diffusion joining etc. can be mentioned, for example. However, as a joining technique which can bear various usage environments and can attain an airtight joining, a diffusion joining is desirable.

Effect

As mentioned above, in the Working Example 1 bypass unit 101, a bypass flow passage is constituted by the groove 111c formed in the first member 111. Therefore, as mentioned above, as compared with a conventional bypass wherein a bypass flow passage is constituted by a plurality of capillary tubes bundled in parallel with each other or a laminated object of a predetermined number of sheets (etching plates) in which many fine pores having an identical shape and layout, a bypass flow passage can be more easily formed with higher accuracy.

Furthermore, in the Working Example 1 bypass unit 101, the bypass flow passage is demarcated by the faces (the bottom face and side faces) constituting the groove 111c formed in the first member 111 and the portion airtightly closing the aperture plane of the groove 111c among the principal surfaces of the external connection part 120 or another first member 111 adjoining and facing the groove 111c. In addition, the bypass flow passage, the first inlet hole 111a and the second inlet hole 121a as an inlet passage for introducing fluid from the outside into the bypass flow passage, and the first outlet hole 111b and the second outlet hole 121b as an outlet passage for outputting the fluid from the bypass flow passage to the outside are formed integrally.

Therefore, in accordance with the Working Example 1 bypass unit, without requiring a member constituting an inlet passage for introducing fluid from the outside into individual bypass flow passages which the bypass part 110 comprises and an outlet passage for outputting the fluid from the individual bypass flow passages which the bypass part 110 comprises to the outside (for example, a joint block etc.) and a member for attaining airtightness (for example, a packing etc.), the bypass part 110 can be interposed in a main flow passage in a flow meter and a flow controller, for example. Namely, in accordance with the Working Example 1 bypass unit, an assembling process of a flow meter and/or a flow controller can be simplified.

In addition, the Working Example 1 bypass unit 101 comprises the inlet piping connecting structure and the outlet piping connecting structure, as mentioned above. Therefore, without requiring a particular jig or tool etc., the inlet piping and the second inlet hole 121a can be fixed by the inlet piping connecting structure such that they communicate airtightly with each other, and the outlet piping and the second outlet hole 121b can be fixed by the outlet piping connecting structure such that they communicate airtightly with each other. Namely, in accordance with the inlet piping connecting structure and the outlet piping connecting structure, a process for interposing the Working Example 1 bypass unit 101 in a main flow passage of fluid in a flow meter and/or a flow controller (assembling process of a flow meter and/or a flow controller) can be further simplified.

Working Example 2

Hereinafter, a bypass unit according to a Working Example 2 of the present invention (which may be referred to as a "Working Example 2 bypass unit" hereinafter) will be explained.

Configuration

As shown in FIGS. 3a-3d, the Working Example 2 bypass unit 102 has fundamentally the same configuration as the Working Example 1 bypass unit 101, except that the first member 111 is constituted as a laminated object in which a second member 112 that is one member having a shape of a sheet and a third member 113 that is one member having a shape of a sheet are laminated. Therefore, a difference between the Working Example 2 bypass unit 102 and the Working Example 1 bypass unit 101 will be focused on and explained below. Moreover, to constituent elements in common with those of the Working Example 1 bypass unit 101, reference signs in common with those of the Working Example 1 bypass unit 101 will be assigned.

Figure 3A:
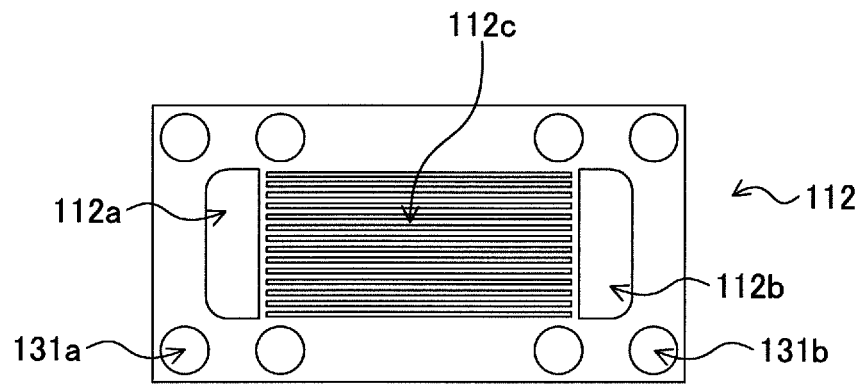
FIGS. 3a and 3b are schematic views for showing a configuration of a second member and third member, respectively, constituting a bypass part of a bypass unit according to a Working Example 2 of the present invention (Working Example 2 bypass unit).

As shown in FIG. 3a, a third inlet hole 112a that is a through-hole having a predetermined size and an approximately quadrangular shape, a third outlet hole 112b which is a through-hole which has a predetermined size and an approximately quadrangular shape, and a slit 112c that is a through-hole having a predetermined width and a predetermined length are formed in the second member 112.

Figure 3B:
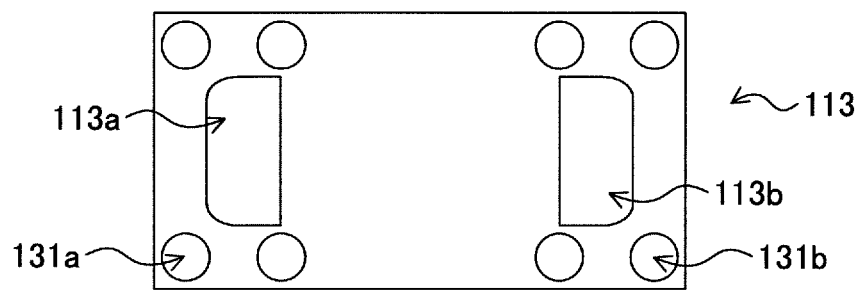

As shown in FIG. 3b, a fourth inlet hole 113a that is at least one through-hole having a predetermined size and an approximately quadrangular shape and a fourth outlet hole 113b which is at least one through-hole which has a predetermined size and an approximately quadrangular shape are formed in the third member 113.

Figure 3C:
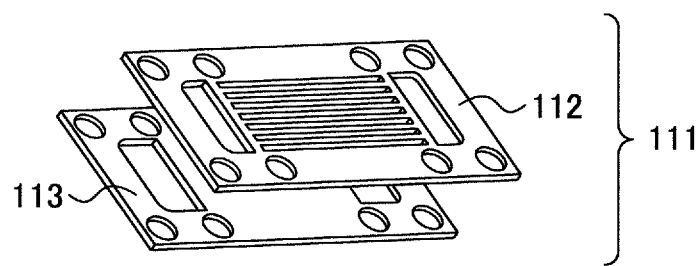
FIG. 3c is a schematic view for showing an alignment of the second member of FIG. 3a and third member of FIG. 3b to form a first member.
Figure 3D:
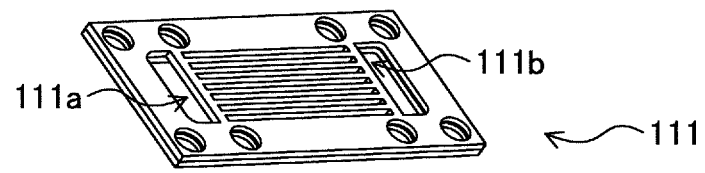
FIG. 3d is a perspective view of the first member formed by the second member of FIG. 3a and third member of FIG. 3b.

As shown in FIG. 3c, in the Working Example 2 bypass unit 102, the first member 111 is constituted as a laminated object in which the second member 112 and the third member 113 are laminated. As a result, as shown in FIG. 3d, the third inlet hole 112a of the second member 112 and the fourth inlet hole 113a of the third member 113 airtightly communicate with each other to form the first inlet hole 111a in the first member 111, and the third outlet hole 112b of the second member 112 and the fourth outlet hole 113b of the third member 113 airtightly communicate with each other to form the first outlet hole 111b in the first member 111.

In addition, in the second member 112, the third inlet hole 112a, the third outlet hole 112b, and the slit 112c are formed independently of one another, without communicating with one another. Therefore, the Working Example 2 bypass unit 102 is configured such that these communicate with one another via the fourth inlet hole 113a and the fourth outlet hole 113b formed in the third member 113 adjacent to the second member 112.

Specifically, an inlet end that is an end closer to the third inlet hole 112a among both ends of the slit 112c and the third inlet hole 112a are configured to airtightly communicate with each other through the fourth inlet hole 113a, and an outlet end that is an end closer to the third outlet hole 112b among both ends of the slit 112c and the third outlet hole 112b are configured to airtightly communicate with each other through the fourth outlet hole 113b. Thereby, fluid can be led to the bypass flow passage constituted by the slit 112c since the third inlet hole 112a and the third outlet hole 112b communicate with each other through the slit 112c.

Specific techniques for making the third inlet hole 112a, the third outlet hole 112b, and the slit 112c communicate with one another through the fourth inlet hole 113a and the fourth outlet hole 113b formed in the third member 113 adjacent to the second member 112 are not limited in particular.

For example, in the Working Example 2 bypass unit 102, such that the fourth inlet hole 113a overlaps with at least a part of the third inlet hole 112a and the inlet end of the slit 112c and the fourth outlet hole 113b overlaps with at least a part of the third outlet hole 112b and the outlet end of the slit 112c, in a parallel-projected projection view projected to a plane parallel to the principal surface of the bypass part 110, these are arranged.

Specifically, the fourth inlet hole 113a is formed extending broader toward the inlet end side of the slit 112c, as compared with the third inlet hole 112a, to such an extent that the fourth inlet hole 113a overlaps with the third inlet hole 112a and overlaps also with the inlet end of the slit 112c in a parallel-projected projection view projected to a plane parallel to the principal surface of the bypass part 110. Similarly, the fourth outlet hole 113b is formed extending broader toward the outlet end side of the slit 112c, as compared with the third outlet hole 112b, to such an extent that the fourth outlet hole 113b overlaps with the third outlet hole 112b and overlaps also with the outlet end of the slit 112c in a parallel-projected projection view projected to a plane parallel to the principal surface of the bypass part 110.

Furthermore, an aperture plane other than the inlet end and the outlet end of the slit 112c formed in the second member 112 is airtightly closed with a portion of the third member 113 where the fourth inlet hole 113a and the fourth outlet hole 113b are not formed to form (a structure corresponding to) the groove 111c in the first member 111.

Therefore, it will be found that the Working Example 2 bypass unit 102 which has the same structure and effect as the Working Example 1 bypass unit 101 can be manufactured by constituting the Working Example 2 bypass unit 102 as shown in FIG. 1a using the laminated object of the second member 112 and the third member 113 in place of the first member 111. However, for the purpose of helping an understanding about the configuration of the Working Example 2 bypass unit 102, a schematic view for explaining the configuration of the Working Example 2 bypass unit 102 is shown in FIG. 4a.

Figure 4A:
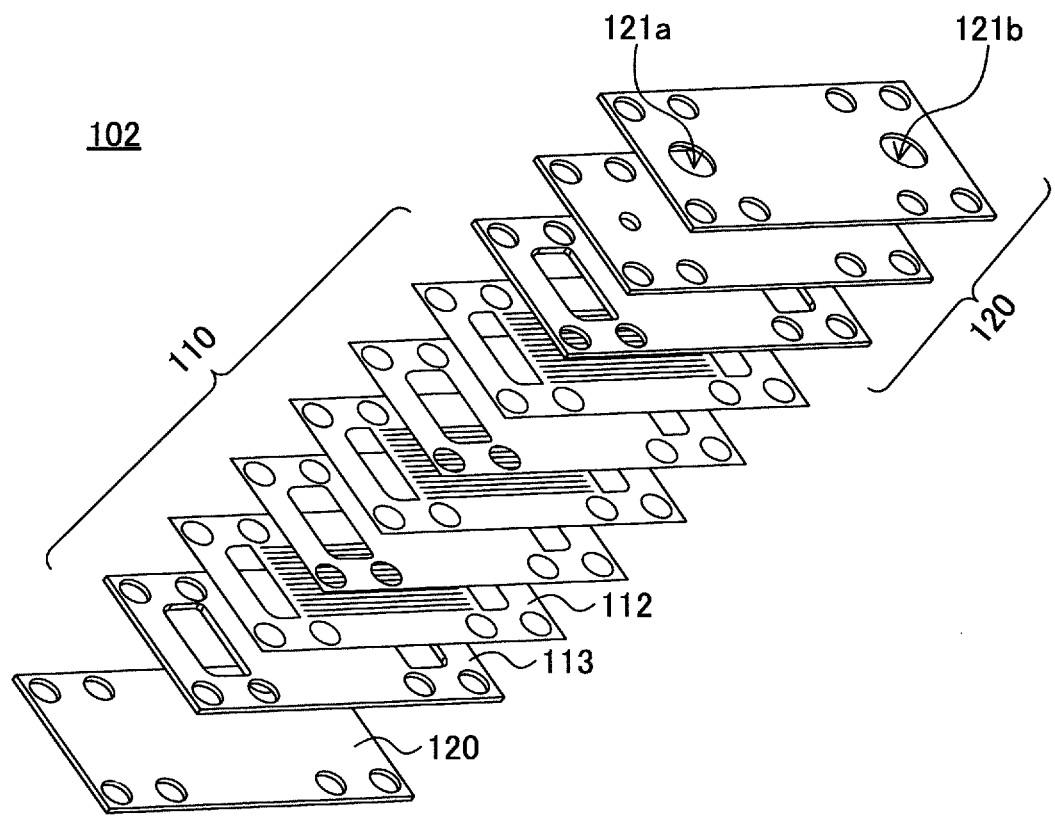
FIG. 4a is a schematic view for showing an alignment of components of the Working Example 2 bypass unit.
Figure 4B:
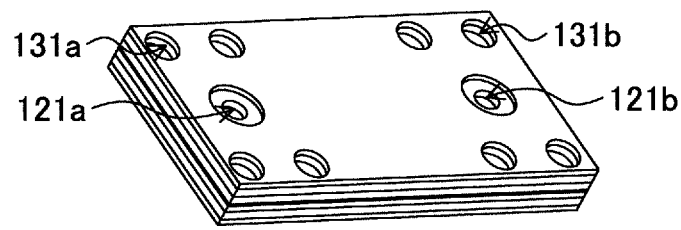
FIG. 4b is a perspective view seen from an upper surface (top surface) side of the Working Example 2 bypass unit.
Figure 4C:
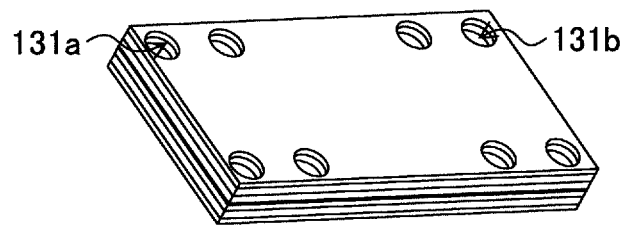
FIG. 4c is a perspective view seen from an under surface (bottom surface) side of the Working Example 2.

As shown in FIG. 4a, in the Working Example 2 bypass unit 102, the bypass part 110 is constituted by laminating three sets of laminated objects of the second member 112 and the third member 113. Moreover, among the pair of the external connection parts 120, the upper external connection part 120 is constituted by a laminated object of three sheets of members in a shape of sheet, and the lower external connection part 120 is constituted by a member in a shape of a sheet.

Since other configurations and manufacturing methods of the Working Example 2 bypass unit 102 are the same as those of the Working Example 1 bypass unit 101, explanation thereof is omitted here.

Effect

As mentioned above, the depth of the groove formed by laminating the second member 112 and the third member 113 is uniquely determined by a thickness of the second member 112 in which the slit 112c is formed. Namely, in accordance with the Working Example 2 bypass unit 102, as compared with the case where a groove is formed directly in the first member, a groove can be formed with higher processing accuracy.

Working Example 3

Hereinafter, a bypass unit according to a Working Example 3 of the present invention (which may be referred to as a "Working Example 3 bypass unit" hereinafter) will be explained.

Configuration

In both the Working Example 1 bypass unit 101 and the Working Example 2 bypass unit 102 which have been explained above, in a parallel-projected projection view projected to a plane parallel to the principal surface of the bypass part 110, the groove 111c (or slit 112c) is formed linearly. However, as mentioned above, the shape of the groove 111c formed in the first member 111 (or slit 112c formed in the second member 112) is not limited in particular, unless the function as a laminar flow element and/or a differential pressure generating means is spoiled.

Figure 5:
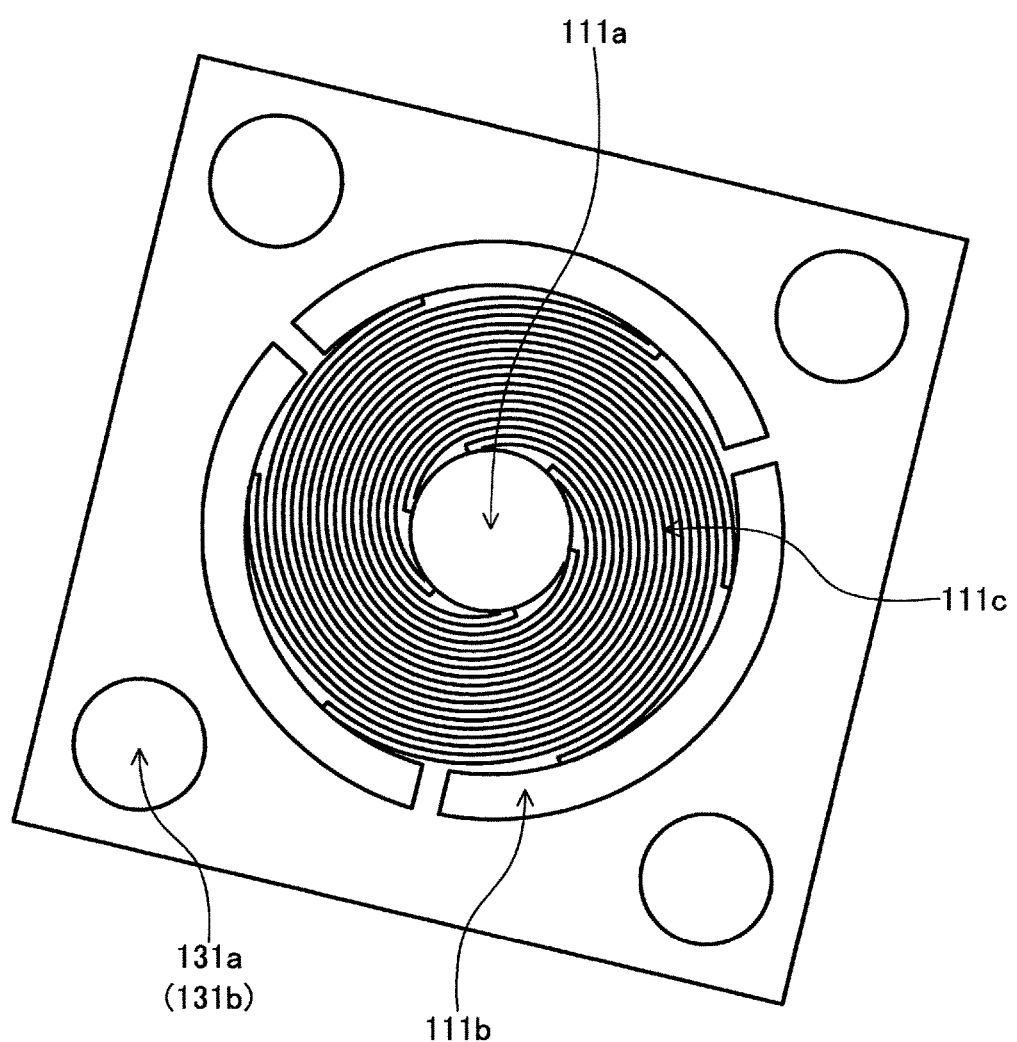
FIG. 5 is a schematic view for showing a configuration of a first member constituting a bypass part of a bypass unit according to a Working Example 3 of the present invention (Working Example 3 bypass unit).

As shown in FIG. 5, the Working Example 3 bypass unit 103 has fundamentally the same configuration as the Working Example 1 bypass unit 101, except that the groove 111c is formed vertically, in a parallel-projected projection view projected to a plane parallel to the principal surface of the bypass part 110. Therefore, a difference between the Working Example 3 bypass unit 103 and the Working Example 1 bypass unit 101 will be focused on and explained below. Moreover, to constituent elements in common with those of the Working Example 1 bypass unit 101, reference signs in common with those of the Working Example 1 bypass unit 101 will be assigned.

The first member 111 in the Working Example 3 bypass unit 103 is a member in a shape of sheet, wherein a first inlet hole 111a which is a through-hole having a circular shape of a predetermined size, first outlet holes 111b which are three through-holes having an arc-like shape of a predetermined size, and a plurality of grooves 111c which communicates with the first inlet hole 111a and the first outlet holes 111b are formed. However, the size, shape and number of the first inlet hole 111a, the first outlet holes 111b and the groove 111c are not limited to the exemplification in FIG. 5.

Figure 6A:
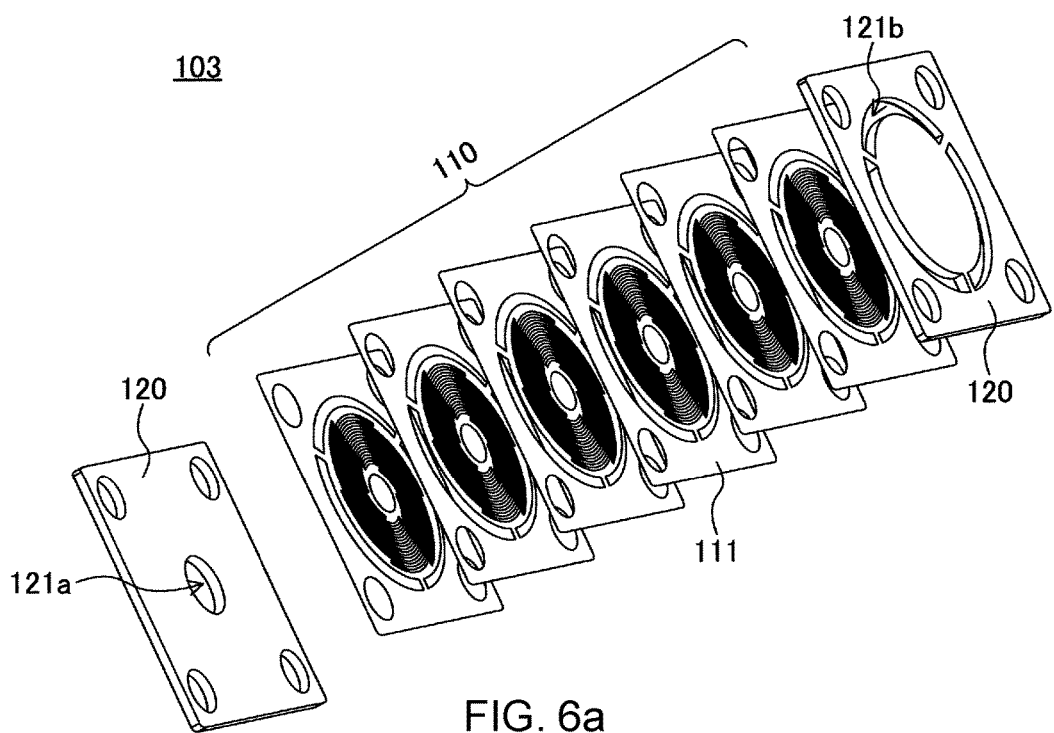
FIG. 6a is a schematic view for showing a configuration of the Working Example 3 bypass unit.

As shown in FIG. 6a, the Working Example 3 bypass unit 103 comprises a bypass part 110 that is a member having a shape of a plate, and a pair of external connection parts 120 that is a pair of members having a shape of a plate and being laminated on two principal surfaces of the bypass part 110, respectively. In the Working Example 3 bypass unit 103, each of the pair of the external connection parts 120 is constituted by a member in shape of a sheet.

The bypass part 110 in the Working Example 3 bypass unit 103 is constituted by a laminated object of six sheets of first members 111. In the laminated object of the first members 111 constituting the bypass part 110, the first members 111 are laminated such that first inlet holes 111a of the adjacent first members 111 airtightly communicate with each other, and first outlet holes 111b of the adjacent first members 111 airtightly communicate with each other.

Moreover, also in the Working Example 3 bypass unit 103, the bypass flow passage is demarcated by faces (a bottom face and side faces) constituting the groove 111c formed in the first member 111 and a portion airtightly closing an aperture plane of the groove 111c among the principal surfaces of the external connection part 120 or another first member 111 adjoining and facing the groove 111c.

On the other hand, in the Working Example 3 bypass unit 103, a second inlet hole 121a which is a through-hole having a circular shape of a predetermined size is formed in the external connection part 120 on the left (lower) side, and second outlet holes 121b which are three through-holes having an arc-like shape of a predetermined size are formed in the external connection part 120 on the right (upper) side, among the pair of the external connection parts 120.

In addition, the Working Example 3 bypass unit 103 is also configured such that the first inlet hole 111a formed in the first member 111 and the second inlet hole 121a formed in the external connection part 120 airtightly communicate with each other and the first outlet holes 111b formed in the first member 111 and the second outlet holes 121b formed in the external connection part 120 airtightly communicate with each other.

Figure 6B:
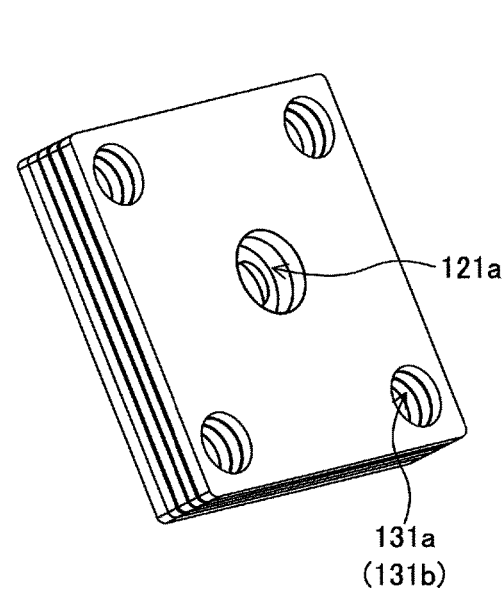
FIG. 6b is a perspective view seen from a left surface side of the Working Example 3 bypass unit.
Figure 6C:
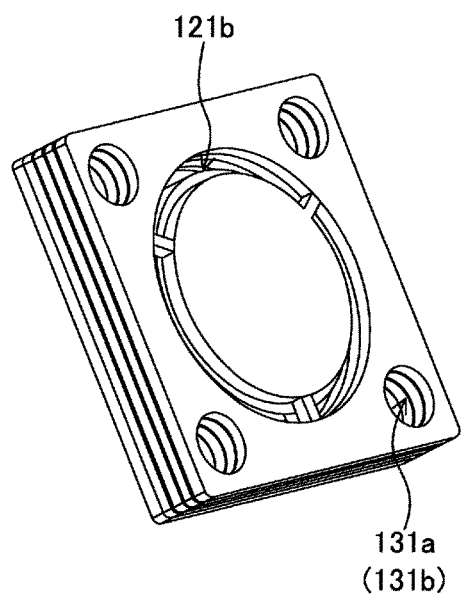
FIG. 6c is a perspective view seen from a right surface side of the Working Example 3 bypass unit.

FIG. 6b is a perspective view seen from a left surface side of the Working Example 3 bypass unit 103, and FIG. 6c is a perspective view seen from a right surface side of the Working Example 3 bypass unit 103. The Working Example 3 bypass unit 103 is a bypass unit in which an inlet hole (second inlet hole 121a) on its left surface, outlet holes (second outlet holes 121b) are formed on its right surface, and a bypass flow passage (groove 111c) is formed in its inside.

In addition, the Working Example 3 bypass unit 103 shown in FIG. 6 also further comprises an inlet piping connecting structure and an outlet piping connecting structure, although they are not essential constituent elements of a bypass unit according to the present invention.

Specifically, four through-holes 131a are formed in the external connection parts 120 shown in FIG. 6a and the first member 111 shown in FIG. 5 such that the four through-holes 131a surround the first inlet hole 111a and the second inlet hole 121a. Moreover, in the Working Example 3 bypass unit 103, the first inlet hole 111a and the second inlet hole 121a are formed in a homocentric manner (coaxially), and the first outlet holes 111b and the second outlet holes 121b are formed in a homocentric manner (coaxially), and the above-mentioned four through-holes 131a also surround the first outlet holes 111b and the second outlet holes 121b.

An inlet piping (not shown), which introduces fluid from the outside, and an outlet piping (not shown), which outputs fluid to the outside, can be fixed to the Working Example 3 bypass unit 103 with bolts inserted through these four through-holes 131a and nuts etc. such that the inlet piping and the second inlet hole 121a airtightly communicate with each other and the outlet piping and the second outlet hole 121b airtightly communicate with each other. Namely, in the Working Example 3 bypass unit 103, since the second inlet hole 121a is formed in one of the pair of the external connection parts 120 and the second outlet holes 121b are formed in the other of the pair of the external connection parts 120, the inlet piping and the outlet piping can be fixed using the above-mentioned four through-holes 131a such that the Working Example 3 bypass unit 103 is sandwiched by the inlet piping and the outlet piping. In other words, the above-mentioned four through-holes 131a play a role of both the inlet piping connecting structure and the outlet piping connecting structure.

Manufacturing Method

Since material of various constituent elements and manufacturing method, etc. of the Working Example 3 bypass unit 103 which has a configuration as mentioned above are the same as those of the Working Example 1 bypass unit 101, explanation thereof is omitted here.

Effect

As mentioned above, the Working Example 3 bypass unit 103 has fundamentally the same configuration as the Working Example 1 bypass unit 101, except that the groove 111c is formed vertically, in a parallel-projected projection view projected to a plane parallel to the principal surface of the bypass part 110. Therefore, effect attained by the Working Example 3 bypass unit 103 is also fundamentally the same as the effect attained by the Working Example 1 bypass unit 101.

Namely, also in the Working Example 3 bypass unit 103, as compared with a conventional bypass, a bypass flow passage can be more easily formed with higher accuracy. Moreover, also in accordance with the Working Example 3 bypass unit 103, an assembling process of a flow meter and/or a flow controller can be simplified. Furthermore, since the Working Example 3 bypass unit 103 also comprises the inlet piping connecting structure and the outlet piping connecting structure, a process for interposing the Working Example 3 bypass unit 103 in a main flow passage of fluid in a flow meter and/or a flow controller (assembling process of a flow meter and/or a flow controller) can be further simplified.

In addition, in the Working Example 3 bypass 103 exemplified in FIG. 5 and FIGS. 6*a-c*, a direction in which fluid flows may be reversed. Namely, even in a case where fluid is introduced from the second outlet hole 121*b* and the fluid is outputted (drawn) from the second inlet hole 121*a*, the same effect as the effect at attained by the Working Example 1 bypass unit 101 can be attained.

Working Example 4

Hereinafter, a bypass unit according to a Working Example 4 of the present invention (which may be referred to as a "Working Example 4 bypass unit" hereinafter) will be explained.

Configuration

Figure 7A:
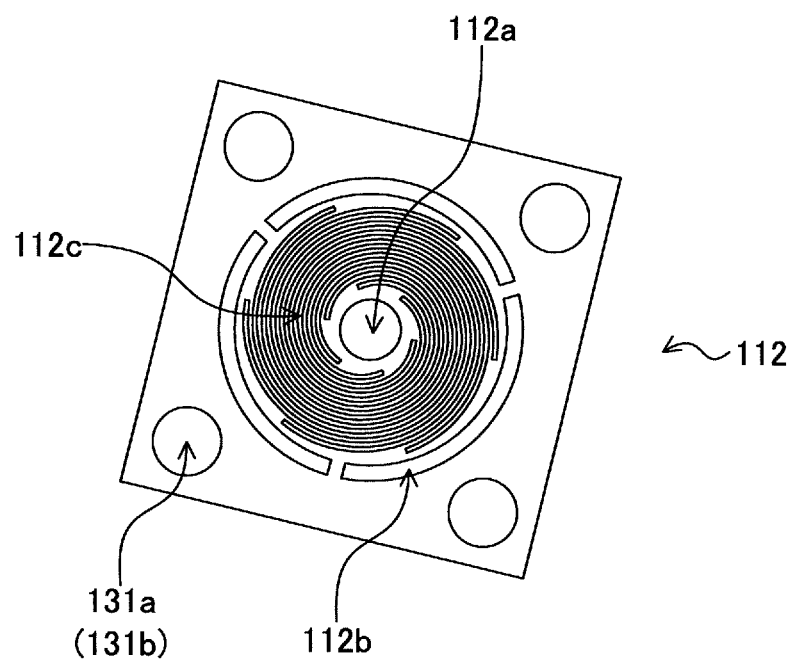
FIGS. 7a and 7b are schematic views for showing a configuration of a second member and a third member, respectively, constituting a bypass part of a bypass unit according to a Working Example 4 of the present invention (Working Example 4 bypass unit).
Figure 7B:
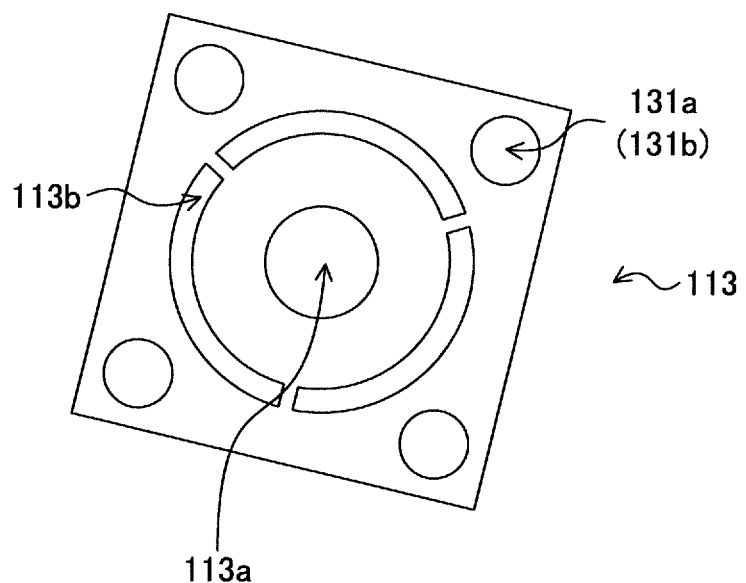

As shown in FIGS. 7*a* and 7*b*, the Working Example 4 bypass unit 104 has fundamentally the same configuration as the Working Example 3 bypass unit 103, except that the first member 111 is constituted as a laminated object in which a second member 112 that is one member having a shape of a sheet and a third member 113 that is one member having a shape of a sheet are laminated. Therefore, a difference between the Working Example 4 bypass unit 104 and the Working Example 3 bypass unit 103 will be focused on and explained below. Moreover, to constituent elements in common with those of the Working Example 3 bypass unit 103, reference signs in common with those of the Working Example 3 bypass unit 103 will be assigned.

As shown in FIG. 7*a*, a third inlet hole 112*a* which is a through-hole having a circular shape of a predetermined size, third outlet holes 112*b* which are three through-holes having an arc-like shape of a predetermined size, and a slit 112*c* that is a through-hole having a predetermined width and a predetermined length are formed in the second member 112.

As shown in FIG. 7*b*, a fourth inlet hole 113*a* which is a through-hole having a circular shape of a predetermined size and fourth outlet holes 113*b* which are three through-holes having an arc-like shape of a predetermined size are formed in the second member 112.

Similarly to the Working Example 2 bypass unit 102, also in the Working Example 4 bypass unit 104, the first member 111 is constituted as a laminated object in which the second member 112 and the third member 113 are laminated. As a result, the third inlet hole 112*a* of the second member 112 and the fourth inlet hole 113*a* of the third member 113 airtightly communicate with each other to form the first inlet hole 111*a* in the first member 111, and the third outlet hole 112*b* of the second member 112 and the fourth outlet hole 113*b* of the third member 113 airtightly communicate with each other to form the first outlet hole 111*b* in the first member 111 (not shown).

In addition, in the second member 112, the third inlet hole 112*a*, the third outlet hole 112*b*, and the slit 112*c* are formed independently of one another, without communicating with one another. Therefore, the Working Example 4 bypass unit 104 is configured such that these communicate with one another via the fourth inlet hole 113*a* and the fourth outlet hole 113*b* formed in the third member 113 adjacent to the second member 112.

Specifically, an inlet end that is an end closer to the third inlet hole 112*a* among both ends of the slit 112*c* and the third inlet hole 112*a* are configured to airtightly communicate with each other through the fourth inlet hole 113*a*, and an outlet end that is an end closer to the third outlet hole 112*b* among both ends of the slit 112*c* and the third outlet hole 112*b* are configured to airtightly communicate with each other through the fourth outlet hole 113*b*. Thereby, fluid can be led to the bypass flow passage constituted by the slit 112*c* since the third inlet hole 112*a* and the third outlet hole 112*b* communicate with each other through the slit 112*c*.

Specific techniques for making the third inlet hole 112*a*, the third outlet hole 112*b*, and the slit 112*c* communicate with one another through the fourth inlet hole 113*a* and the fourth outlet hole 113*b* formed in the third member 113 adjacent to the second member 112 are not limited in particular.

For example, in the Working Example 4 bypass unit 104, such that the fourth inlet hole 113*a* overlaps with at least a part of the third inlet hole 112*a* and the inlet end of the slit 112*c* and the fourth outlet hole 113*b* overlaps with at least a part of the third outlet hole 112*b* and the outlet end of the slit 112*c*, in a parallel-projected projection view projected to a plane parallel to the principal surface of the bypass part 110, these are arranged.

Specifically, the fourth inlet hole 113*a* is formed extending broader toward the inlet end side (outside of the vortex) of the slit 112*c*, as compared with the third inlet hole 112*a*, to such an extent that the fourth inlet hole 113*a* overlaps with the third inlet hole 112*a* and overlaps also with the inlet end of the slit 112*c* in a parallel-projected projection view projected to a plane parallel to the principal surface of the bypass part 110. Similarly, the fourth outlet hole 113*b* is formed extending broader toward the outlet end side (central side of the vortex) of the slit 112*c*, as compared with the third outlet hole 112*b*, to such an extent that the fourth outlet hole 113*b* overlaps with the third outlet hole 112*b* and overlaps also with the outlet end of the slit 112*c* in a parallel-projected projection view projected to a plane parallel to the principal surface of the bypass part 110.

Furthermore, an aperture plane other than the inlet end and the outlet end of the slit 112*c* formed in the second member 112 is airtightly closed with a portion of the third member 113 where the fourth inlet hole 113*a* and the fourth outlet hole 113*b* are not formed to form (a structure corresponding to) the groove 111*c* in the first member 111.

Therefore, it will be found that the Working Example 4 bypass unit 104 which has the same structure and effect as the Working Example 3 bypass unit 103 can be manufactured by constituting the Working Example 4 bypass unit 104 as shown in FIG. 6*a* using the laminated object of the second member 112 and the third member 113 in place of the first member 111. However, for the purpose of helping an understanding about the configuration of the Working Example 4 bypass unit 104, a schematic view for explaining the configuration of the Working Example 4 bypass unit 104 is shown in FIGS. 8*a*-8*c*.

Figure 8A:
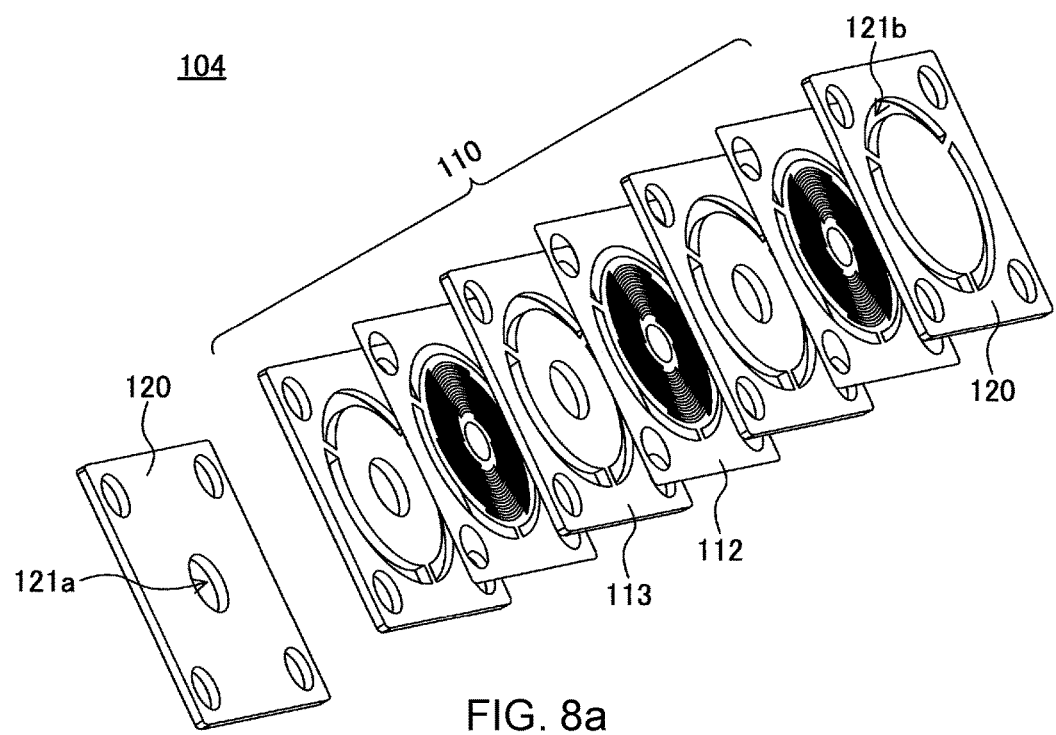
FIG. 8a is a schematic view for showing a configuration of the Working Example 4 bypass unit.
Figure 8B:
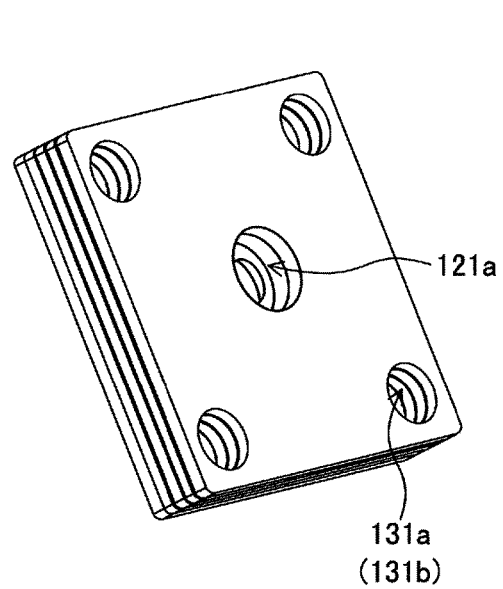
FIG. 8b is a perspective view seen from a left surface side of the Working Example 4 bypass unit.
Figure 8C:
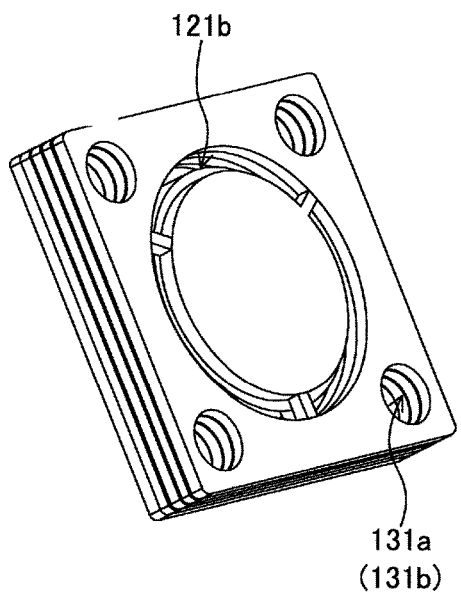
FIG. 8c is a perspective view seen from a right surface side of the Working Example 4 bypass unit.

As shown in FIG. 8*a*, in the Working Example 4 bypass unit 104, the bypass part 110 is constituted by laminating three sets of laminated objects of the second member 112 and the third member 113. Moreover, a second inlet hole 121a which is a through-hole having a circular shape of a predetermined size is formed in the external connection part 120 on the left (lower) side, and second outlet holes 121b which are three through-holes having an arc-like shape of a predetermined size are formed in the external connection part 120 on the right (upper) side, among the pair of the external connection parts 120.

Since other configurations and manufacturing methods of the Working Example 4 bypass unit 104 are the same as those of the Working Example 3 bypass unit 103, explanation thereof is omitted here.

Effect

As mentioned above, the depth of the groove formed by laminating the second member 112 and the third member 113 is uniquely determined by a thickness of the second member 112 in which the slit 112c is formed. Namely, in accordance with the Working Example 4 bypass unit 104, as compared with the case where a groove is formed directly in the first member, a groove can be formed with higher processing accuracy.

The various bypass units according to the various embodiments of the present invention, which have been explained above, are bypass units wherein the bypass part in which the bypass flow passage is formed in the inside, the inlet passage for introducing fluid from the outside into the bypass flow passage, and the outlet passage for outputting the fluid from the bypass flow passage to the outside are formed integrally. Therefore, since it is not necessary to airtightly connect the inlet passage and outlet passage as separate members like the conventional bypass, an assembling process of a flow meter and/or a flow controller etc. can be simplified, for example.

Figure 9:
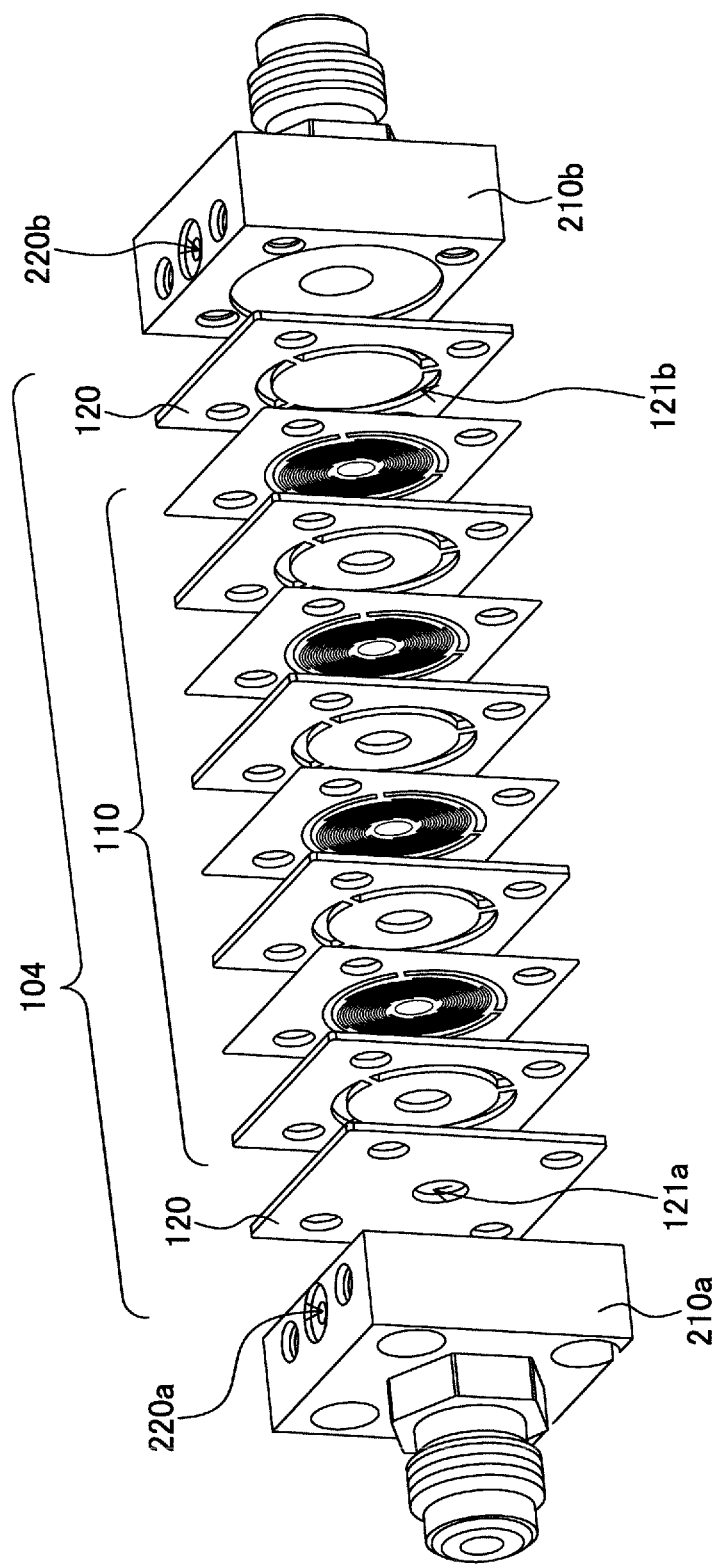
FIG. 9 is a schematic view for showing a situation where a joint which has a branching is connected to the Working Example 4 bypass unit.

However, in order to airtightly connect a sensor tube and/or a pressure sensor, etc., for example, to the above-mentioned bypass unit, as shown in FIG. 9, for example, a separate member, such as a joint which has a branching, is needed. FIG. 9 is a schematic view for showing a situation that a joint, which has a branching for airtightly connect a sensor tube and/or a pressure sensor etc., for example, to the Working Example 4 bypass unit 104. Although the Working Example 4 bypass unit 104 comprises the second inlet hole 121a and the second outlet hole 121b, it does not have an aperture and a flow passage for airtightly connecting a sensor tube and/or a pressure sensor, etc., for example.

Therefore, an inlet side joint 210a with an inlet side branching flow passage formed inside (not shown) and an aperture 220a of the inlet side branching flow passage is connected to the inlet side (left side) of the Working Example 4 bypass unit 104 such that the branching flow passage and the second inlet hole 121a airtightly communicate with each other. Similarly, an outlet side joint 210b with an outlet side branching flow passage formed inside (not shown) and an aperture 220b of the outlet side branching flow passage is connected to the outlet side (right side) of the Working Example 4 bypass unit 104 such that the branching flow passage and the second outlet hole 121b airtightly communicate with each other. Thereby, it becomes possible to airtightly connect a sensor tube and/or a pressure sensor, etc. to the Working Example 4 bypass unit 104, for example.

Figure 10A:
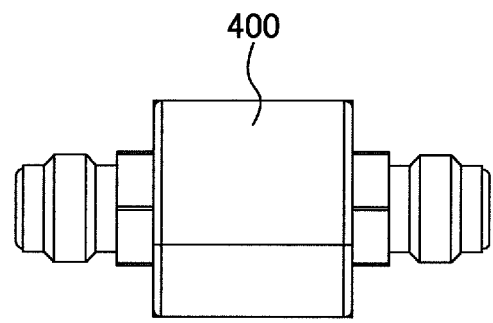
FIGS. 10a, 10b, and 10c are schematic plan view, side view, and front elevational view, respectively, of a differential pressure type flow meter constituted by the Working Example 4 bypass unit with which the joint which has a branching and is shown in FIG. 9 is connected.
Figure 10B:
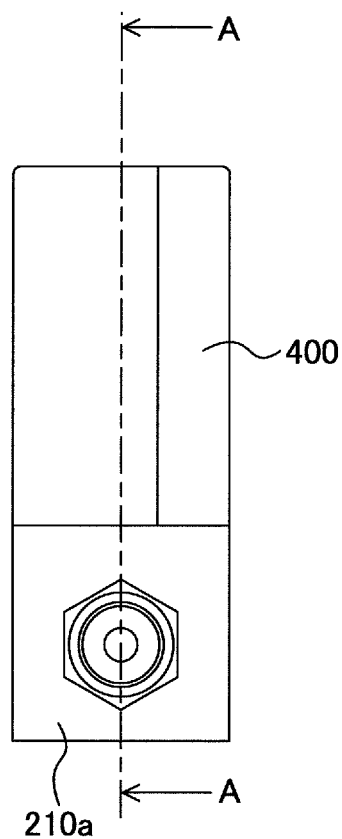
Figure 10C:
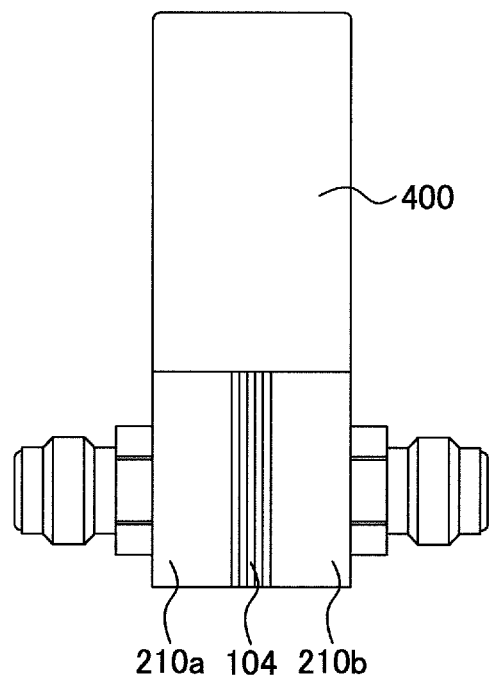

FIG. 10a depicts a schematic plan view, FIG. 10b depicts a side view, and FIG. 10c depicts a front elevational view of a differential pressure type flow meter constituted by the Working Example 4 bypass unit 104 with which the joint which has a branching and is shown in FIG. 9 is connected is shown in FIGS. 10a-c. A casing 400 is disposed on an upper part of a base constituted by the Working Example 4 bypass unit 104, an inlet side joint 210a and an outlet side joint 210b. Since the Working Example 4 bypass unit 104 comprises a vortical bypass flow passage as shown in FIG. 9, the bypass unit is compact (space-saving) and suitable for downsizing of a flow meter.

Figure 11:
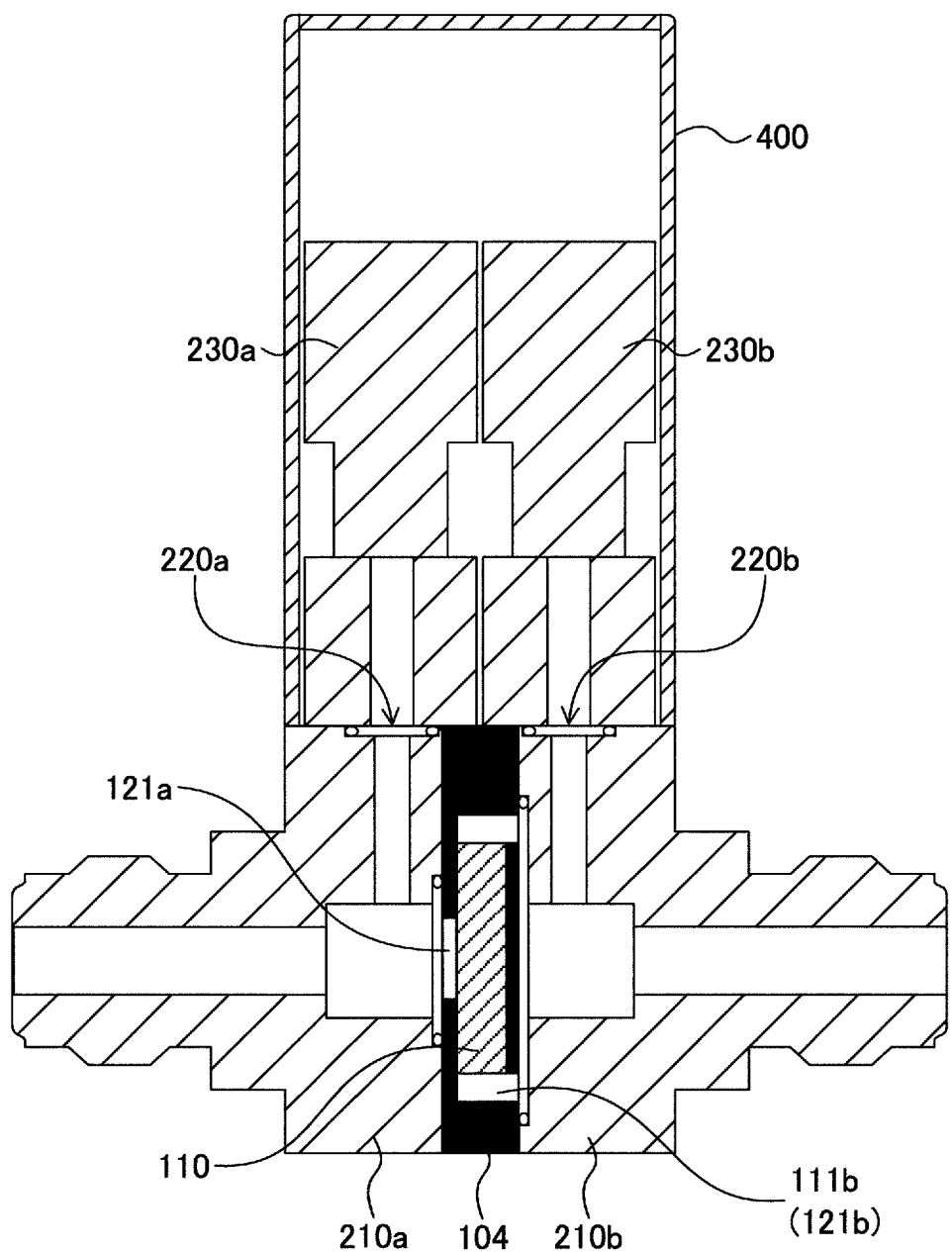
FIG. 11 is a schematic sectional view of the differential pressure type flow meter by a cross-section A-A shown in (b) of FIG. 10.

Furthermore, a schematic sectional view of the differential pressure type flow meter by a cross-section A-A shown in FIG. 10b is shown in FIG. 11. A black-lacquered region in FIG. 11 expresses a cross-sectional region, in which portions of the first members 111 with neither through-hole nor groove formed are laminated to be a block. The Working Example 4 bypass unit 104 is sandwiched by the inlet side joint 210a and the outlet side joint 210b, and an upstream side pressure sensor 230a and a downstream side pressure sensor 230b are connected to respective upper parts of the inlet side joint 210a and the outlet side joint 210b through apertures 220a and 220b of a branching flow passage, respectively. Moreover, in the inside of the Working Example 4 bypass unit 104, the bypass part 110 shown in shade, the second inlet hole 121a and an outlet passage consisting of the first outlet hole 111b and the second outlet hole 121b are formed integrally. In accordance with the Working Example 4 bypass unit 104, an assembling process of a differential pressure type flow meter can be simplified by such a configuration.

However, for example, from a viewpoint of further simplifying an assembling process of a flow meter and/or a flow controller etc., it is desirable that branching flow passages and apertures as mentioned above are also formed integrally with the bypass unit according to the present invention. Namely, it is desirable that a base for a flow meter, which is a base for assembling a flow meter, and a base for a flow controller, which is a base for assembling a flow controller, are also formed integrally with the bypass unit according to the present invention. Embodiments as such various bases will be explained in detail below.

Working Example 5

Hereinafter, a base for a flow meter according to a Working Example 5 of the present invention (which may be referred to as a "Working Example 5 base for a flow meter" hereinafter) will be explained.

Configuration

Figure 12A:
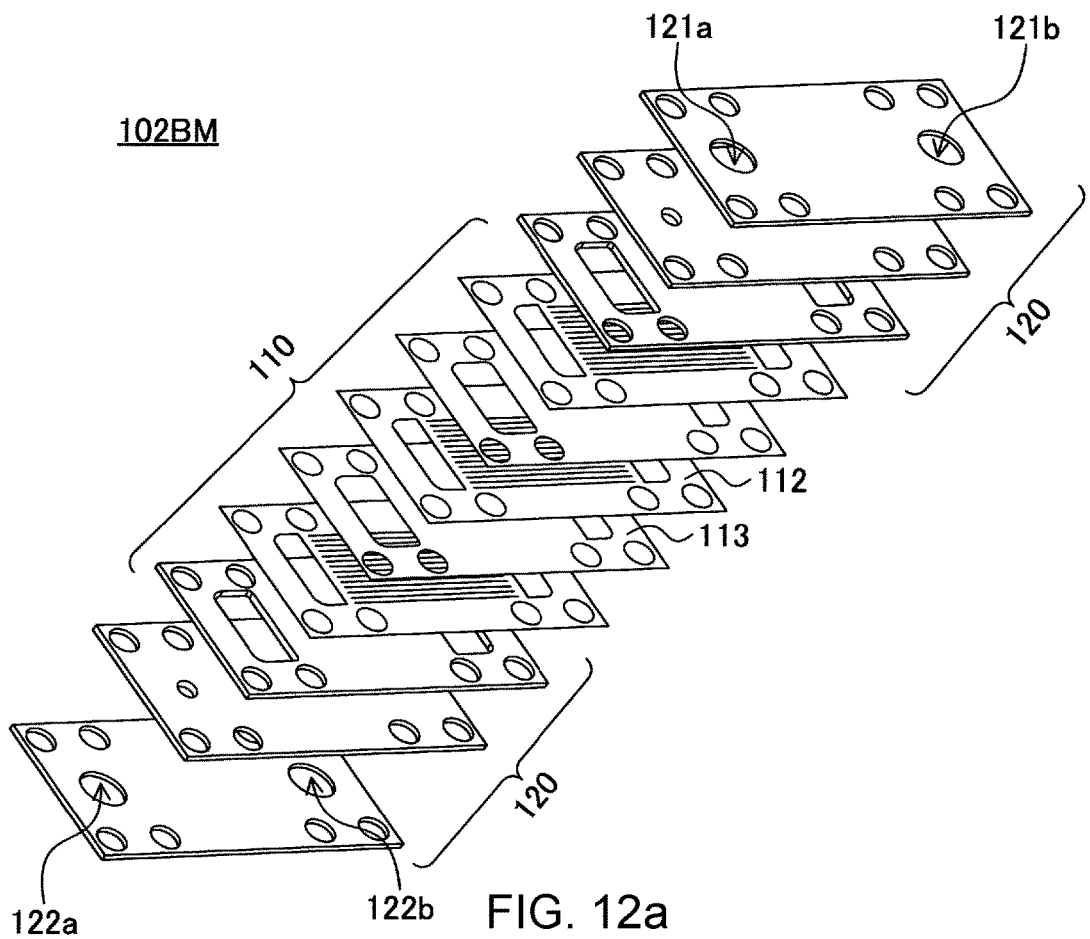
FIG. 12a is a schematic view for showing a configuration of a base for a flow meter according to a Working Example 5 of the present invention (Working Example 5 base for a flow meter).

As shown in FIG. 12a, the Working Example 5 base for a flow meter 102BM has fundamentally the same configuration as the Working Example 2 bypass unit 102, except that an inlet side branch hole 122a that is a through-hole having a circular shape of a predetermined size and airtightly communicates with the first inlet hole 111a and the outlet side branch hole 122b that is a through-hole having a circular shape of a predetermined size and airtightly communicates with the first outlet hole 111b are formed in the lower external connection part 120.

Therefore, a difference between the Working Example 5 base for a flow meter 102BM and the Working Example 2 bypass unit 102 will be focused on and explained below. Moreover, to constituent elements in common with those of the Working Example 2 bypass unit 102, reference signs in common with those of the Working Example 2 bypass unit 102 will be assigned.

As shown in FIG. 12a, the inlet side branch hole 122a communicates with the first inlet hole 111a (constituted by the third inlet hole 112a and the fourth inlet hole 113a). Therefore, in the Working Example 5 base for a flow meter 102BM, the first inlet hole 111a forms a branching flow passage which branches fluid introduced from the second inlet hole 121a into (the bypass flow passage of) the bypass part 110 and the inlet side branch hole 122a. Similarly, the outlet side branch hole 122b communicates with the first outlet hole 111b (constituted by the third outlet hole 112b and the fourth outlet hole 113b). Therefore, in the Working Example 5 base for a flow meter 102BM, the first outlet hole 111b forms a branching flow passage which makes fluid outputted from (the bypass flow passage of) the bypass part 110 and fluid introduced from the outlet side branch hole 122b join together.

Figure 12B:
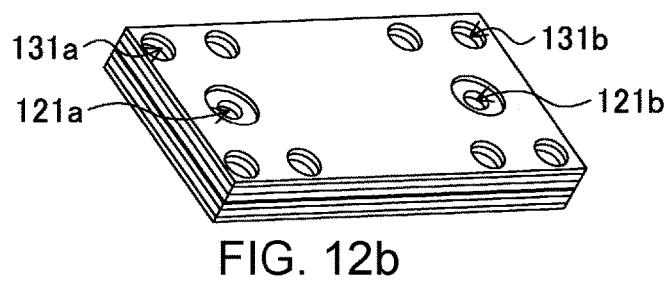
FIG. 12b is a perspective view seen from an upper surface (top surface) side of the Working Example 5 base.
Figure 12C:
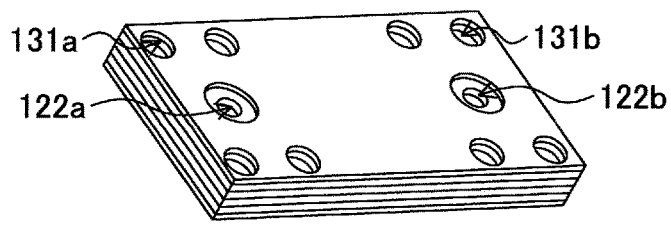
FIG. 12c is a perspective view seen from the lower surface (bottom surface) side of the Working Example 5 base.

FIG. 12b is a perspective view seen from an upper surface (top surface) side of the Working Example 5 base for a flow meter 102BM, and FIG. 12c is a perspective view seen from the lower surface (bottom surface) side of the Working Example 5 base for a flow meter 102BM. The Working Example 5 base for a flow meter 102BM is a base for a flow meter, in which an inlet hole (second inlet hole 121a) and an outlet hole (second outlet hole 121b) are formed on its top surface, an inlet side branch hole 122a and an outlet side branch hole 122b are formed on its bottom surface, and a bypass flow passage (groove 111c) is formed in its inside.

In addition, the Working Example 5 base for a flow meter 102BM shown in FIGS. 12a-12c further comprises a branch connecting structure that is a structure for connecting a fourth member that is a separate member, which has an internal space, (for example, a sensor tube and a pressure sensor), in addition to the above-mentioned inlet piping connecting structure and outlet piping connecting structure, such that the inlet side branch hole 122a and/or the outlet side branch hole 122b airtightly communicate with the internal space, although they are not essential constituent elements of a base for a flow meter according to the present invention.

Specifically, four through-holes 131a are formed in the external connection parts 120 shown in FIG. 12a and the first member 111 such that the four through-holes 131a surround the first inlet hole 111a, the second inlet hole 121a and the inlet side branch hole 122a. Moreover, a level difference is formed in an aperture of the second inlet hole 121a due to a difference in the size between the second inlet holes 121a formed in two sheets of members which constitute the upper external connection part 120. Furthermore, a level difference is formed in an aperture of the inlet side branch hole 122a due to a difference in the size between the inlet side branch holes 122a formed in two sheets of members which constitute the lower external connection part 120.

An inlet piping connecting structure that is a structure for fixing an inlet piping which introduces fluid from the outside (not shown) to the Working Example 5 base for a flow meter 102BM such that the inlet piping and the second inlet hole 121a airtightly communicate with each other is constituted by these through-holes 131a and the level difference (formed in an aperture of the second inlet hole 121a). Furthermore, a branching connecting structure that is a structure for fixing a sensor tube and/or pressure sensor (both not shown) to the Working Example 5 base for a flow meter 102BM such that the sensor tube and/or pressure sensor airtightly communicate with the inlet side branch hole 122a is constituted by these through-holes 131a and the level difference (formed in an aperture of the inlet side branch hole 122a).

Namely, in the Working Example 5 base for a flow meter 102BM, since the second inlet hole 121a is formed in one of the pair of the external connection parts 120 and the inlet side branch hole 122a is formed in the other of the pair of the external connection parts 120, the inlet piping and a fourth member that is a separate member having an internal space (for example, a sensor tube and a pressure sensor) can be fixed using the above-mentioned four through-holes 131a such that the Working Example 5 base for a flow meter 102BM is sandwiched by the inlet piping and the fourth member. In other words, the above-mentioned four through-holes 131a play a role of both the inlet piping connecting structure and the branching connecting structure.

In order to fix the inlet piping and the fourth member to the Working Example 5 base for a flow meter 102BM using the above-mentioned inlet piping connecting structure (branching connecting structure), first, the inlet piping is appressed against the Working Example 5 base for a flow meter 102BM in a state where a packing is fitted in the above-mentioned level difference formed in the aperture of the second inlet hole 121a, and the fourth member is appressed against the Working Example 5 base for a flow meter 102BM in a state where a packing is fitted in the above-mentioned level difference formed in the aperture of the inlet side branch hole 122a. Next, bolts are inserted into the through-holes 131a and through-holes prepared in (a flange of) the inlet piping and (a flange of) the fourth member, and the bolts are fastened with nuts finally. Thereby, the inlet piping and the fourth member can be fixed to the Working Example 5 base for a flow meter 102BM in a state where a packing has been crushed and airtightness has been maintained.

Similarly, four through-holes 131b are formed in the external connection parts 120 shown in FIG. 12a and the first member 111 such that the four through-holes 131b surround the first outlet hole 111b, the second outlet hole 121b and the outlet side branch hole 122b. Moreover, a level difference is formed in an aperture of the second outlet hole 121b due to a difference in the size between the second outlet holes 121b formed in two sheets of members which constitute the upper external connection part 120. Furthermore, a level difference is formed in an aperture of the outlet side branch hole 122b due to a difference in the size between the outlet side branch holes 122b formed in two sheets of members which constitute the lower external connection part 120.

An outlet piping connecting structure that is a structure for fixing an outlet piping which outputs fluid to the outside (not shown) to the Working Example 5 base for a flow meter 102BM such that the outlet piping and the second outlet hole 121b airtightly communicate with each other is constituted by these through-holes 131b and the level difference (formed in an aperture of the second outlet hole 121b). Furthermore, a branching connecting structure that is a structure for fixing a sensor tube and/or pressure sensor (both not shown) to the Working Example 5 base for a flow meter 102BM such that the sensor tube and/or pressure sensor airtightly communicate with the outlet side branch hole 122b is constituted by these through-holes 131b and the level difference (formed in an aperture of the outlet side branch hole 122b).

Namely, in the Working Example 5 base for a flow meter 102BM, since the second outlet hole 121b is formed in one of the pair of the external connection parts 120 and the outlet side branch hole 122b is formed in the other of the pair of the external connection parts 120, the inlet piping and a fourth member that is a separate member having an internal space (for example, a sensor tube and a pressure sensor) can be fixed using the above-mentioned four through-holes 131b such that the Working Example 5 base for a flow meter 102BM is sandwiched by the inlet piping and the fourth member. In other words, the above-mentioned four through-holes 131b play a role of both the outlet piping connecting structure and the branching connecting structure.

In order to fix the outlet piping and the fourth member to the Working Example 5 base for a flow meter 102BM using the above-mentioned outlet piping connecting structure (branching connecting structure), first, the outlet piping is appressed against the Working Example 5 base for a flow meter 102BM in a state where a packing is fitted in the above-mentioned level difference formed in the aperture of the second outlet hole 121b, and the fourth member is appressed against the Working Example 5 base for a flow meter 102BM in a state where a packing is fitted in the above-mentioned level difference formed in the aperture of the outlet side branch hole 122b. Next, bolts are inserted into the through-holes 131b and through-holes prepared in (a flange of) the outlet piping and (a flange of) the fourth member, and the bolts are fastened with nuts finally. Thereby, the outlet piping and the fourth member can be fixed to the Working Example 5 base for a flow meter 102BM in a state where a packing has been crushed and airtightness has been maintained.

However, configurations of the inlet piping connecting structure, the outlet piping connecting structure, and the branch connecting structure are not limited to the exemplification in FIG. 12a.

Effect

In accordance with this, a thermal type flow meter can be easily constituted by fixing a sensor tube to the Working Example 5 base for a flow meter 102BM such that the inlet side branch hole 122a and the outlet side branch hole 122b airtightly communicate with each other through the inside of the sensor tube, for example. Alternatively, a differential pressure type flow meter can be easily constituted by fixing an upstream side pressure sensor to the Working Example 5 base for a flow meter 102BM such that a detection part of the upstream side pressure sensor exposes to a space airtightly communicating with the inlet side branch hole 122a and fixing a downstream side pressure sensor to the Working Example 5 base for a flow meter 102BM such that a detection part of the downstream side pressure sensor exposes to a space airtightly communicating with the outlet side branch hole 122b.

Furthermore, in both of a case where a thermal type flow meter is constituted using the Working Example 5 base for a flow meter 102BM and a case where a differential pressure type flow meter is constituted using the Working Example 5 base for a flow meter 102BM, in accordance with the above-mentioned configuration, without requiring a special jig or tool etc., the fourth member that is a separate member which has an internal space (for example, a sensor tube and a pressure sensor) can be fixed to the Working Example 5 base for a flow meter 102BM such that the inlet side branch hole 122a and/or the outlet side branch hole 122b airtightly communicate with the internal space. Namely, an assembling process of a thermal type flow meter and/or a differential pressure type flow meter can be further simplified.

In addition, although the first member 111 is constituted as a laminated object of the second member 112 which has the slit 112c and the third member 113 which does not have a slit as mentioned above in the Working Example 5 base for a flow meter 102BM, it is needless to say that a base for a flow meter according to the present invention may comprise the bypass part 110 constituted by the first member 111 in which the groove 111c is formed directly.

Working Example 6

Hereinafter, a base for a flow meter according to a Working Example 6 of the present invention (which may be referred to as a "Working Example 6 base for a flow meter" hereinafter) will be explained.

Configuration

Figure 13A:
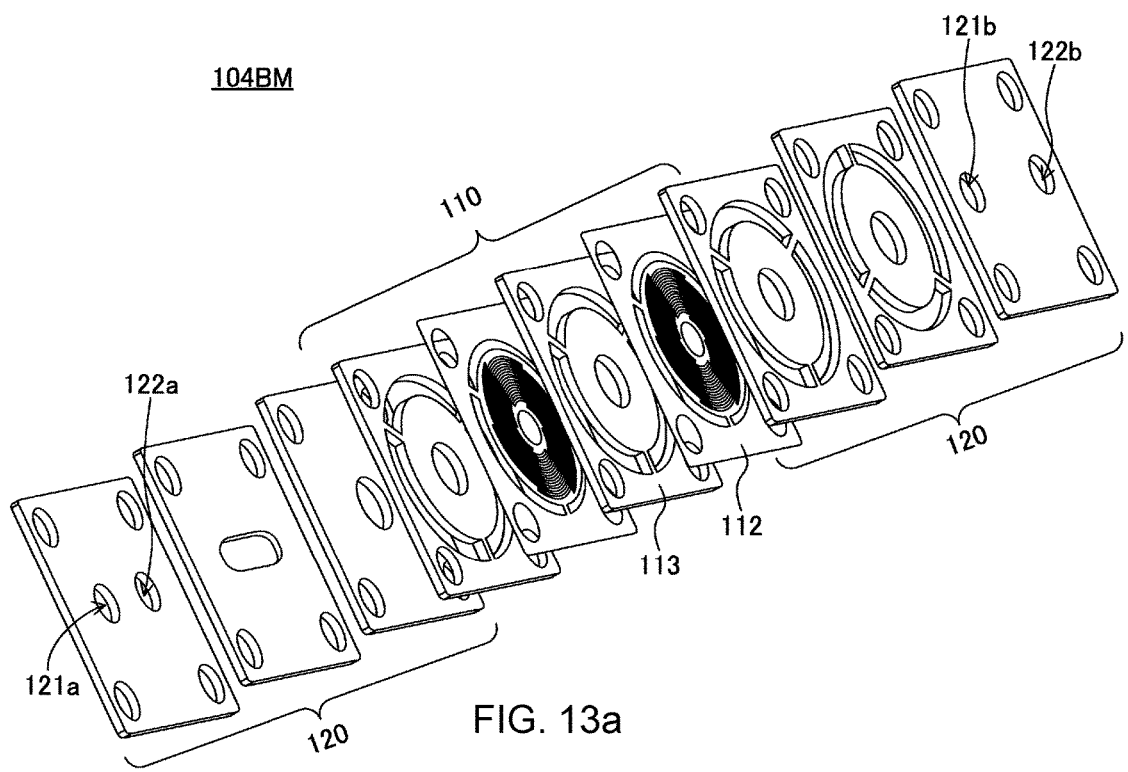
FIG. 13a is a schematic view for showing a configuration of a base for a flow meter according to a Working Example 6 of the present invention (Working Example 6 base for a flow meter).

As shown in FIG. 13a, the Working Example 6 base for a flow meter 104BM has fundamentally the same configuration as the Working Example 4 bypass unit 104, except that an inlet side branch hole 122a is formed in one of the pair of the external connection parts 120, an outlet side branch hole 122b is formed in the other of the pair of the external connection parts 120, the inlet side branch hole 122a is configured to airtightly communicate with the first inlet hole 111a, and the outlet side branch hole 122b is configured to airtightly communicate with the first outlet hole 111b. Furthermore, the Working Example 6 base for a flow meter 104BM has fundamentally the same configuration as the Working Example 5 base for a flow meter 102BM, except that the Working Example 6 base for a flow meter 104BM comprises a vortical bypass flow passage.

Figure 13B:
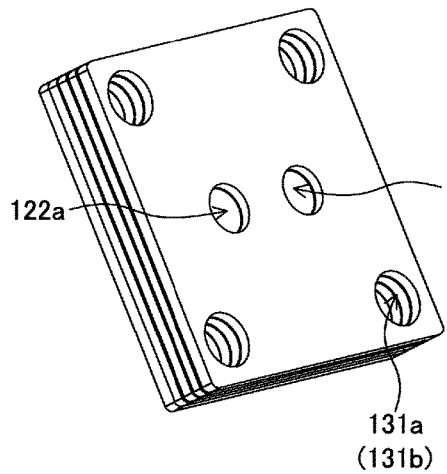
FIG. 13b is a perspective view seen from a left surface (lower surface) side of the Working Example 6 base.
Figure 13C:
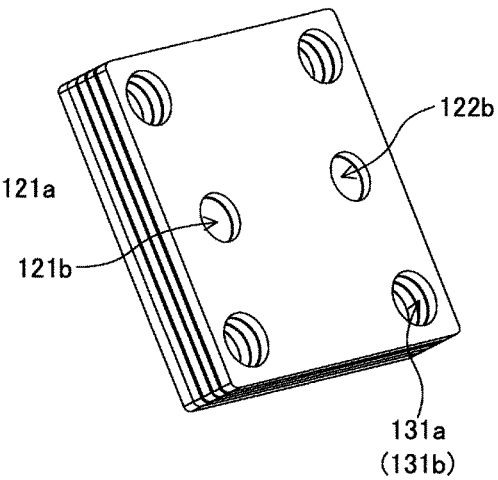
FIG. 13c is a perspective view seen from the right surface (upper surface) side of the Working Example 6 base.

FIG. 13bb is a perspective view seen from an left surface (lower surface) side of the Working Example 6 base for a flow meter 104BM, FIG. 13c is a perspective view seen from the right surface (upper surface) side of the Working Example 6 base for a flow meter 104BM. The Working Example 6 base for a flow meter 104BM is a base for a flow meter, in which an inlet hole (second inlet hole 121a) and an inlet side branch hole 122a are formed on its left surface, an outlet hole (second outlet hole 121b) and an outlet side branch hole 122b are formed on its right surface, and a bypass flow passage (groove 111c) is formed in its inside.

In addition, the Working Example 6 base for a flow meter 104BM shown in FIG. 13a also further comprises a branch connecting structure that is a structure for connecting a fourth member that is a separate member, which has an internal space, (for example, a sensor tube and a pressure sensor), in addition to the above-mentioned inlet piping connecting structure and outlet piping connecting structure, such that the inlet side branch hole 122a and/or the outlet side branch hole 122b airtightly communicate with the internal space, although they are not essential constituent elements of a base for a flow meter according to the present invention.

Effect

Since the inlet side branch hole 122a and the outlet side branch hole 122b are formed as mentioned above, the Working Example 6 base for a flow meter 104BM can attain the same effect as the Working Example 5 base for a flow meter 102BM.

Specifically, a thermal type flow meter can be easily constituted by fixing a sensor tube to the Working Example 6 base for a flow meter 104BM such that the inlet side branch hole 122a and the outlet side branch hole 122b airtightly communicate with each other through the inside of the sensor tube, for example. Alternatively, a differential pressure type flow meter can be easily constituted by fixing an upstream side pressure sensor to the Working Example 6 base for a flow meter 104BM such that a detection part of the upstream side pressure sensor exposes to a space airtightly communicating with the inlet side branch hole 122a and fixing a downstream side pressure sensor to the Working Example 6 base for a flow meter 104BM such that a detection part of the downstream side pressure sensor exposes to a space airtightly communicating with the outlet side branch hole 122b.

Furthermore, in both of a case where a thermal type flow meter is constituted using the Working Example 6 base for a flow meter 104BM and a case where a differential pressure type flow meter is constituted using the Working Example 6 base for a flow meter 104BM, in accordance with the above-mentioned configuration, without requiring a special jig or tool etc., the fourth member that is a separate member which has an internal space (for example, a sensor tube and a pressure sensor) can be fixed to the Working Example 6 base for a flow meter 104BM by the branch connecting structure such that the inlet side branch hole 122a and/or the outlet side branch hole 122b airtightly communicate with the internal space. Namely, an assembling process of a thermal type flow meter and/or a differential pressure type flow meter can be further simplified.

In addition, although the first member 111 is constituted as a laminated object of the second member 112 which has the slit 112c and the third member 113 which does not have a slit as mentioned above in the Working Example 6 base for a flow meter 104BM, it is needless to say that a base for a flow meter according to the present invention may comprise the bypass part 110 constituted by the first member 111 in which the groove 111c is formed directly.

Hereinafter, a base for a flow controller according to a Working Example 7 of the present invention (which may be referred to as a "Working Example 7 base for a flow controller" hereinafter) will be explained.

Configuration

The Working Example 7 base for a flow controller 101BC is a base for a flow controller which comprises the above-mentioned base for a flow meter according to the present invention. Therefore, explanation about matters common with the base for a flow meter according to the present invention will be omitted.

As shown in FIG. 14 and FIGS. 15a-15c, in the Working Example 7 base for a flow controller 101BC, a fifth inlet hole 123a that is a through-hole having an arc-like shape of a predetermined size is further formed in the upper external connection part 120, and the fifth outlet hole 123b that is a through-hole having a circular shape of a predetermined size is further formed in the lower external connection part 120, among the pair of the external connection parts 120.

Figure 15A:
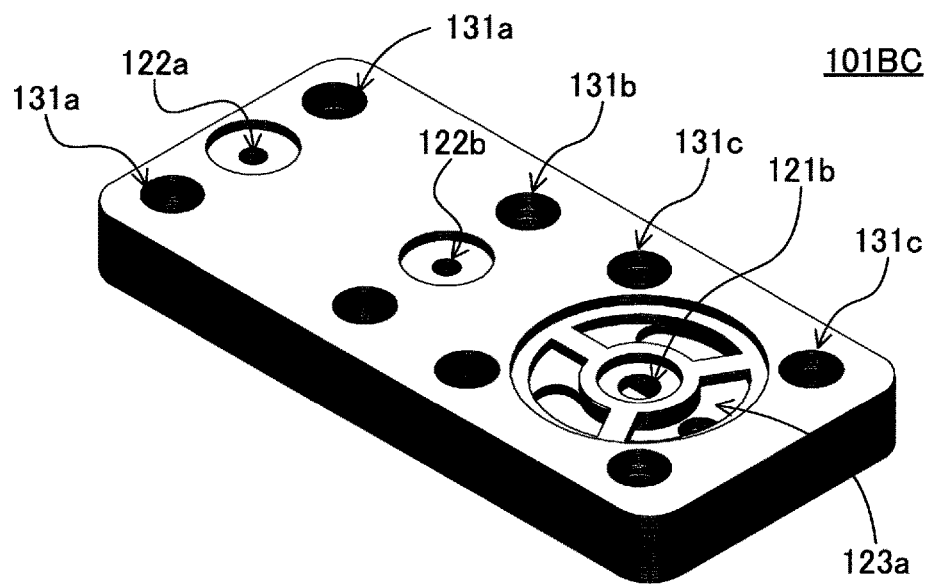
FIGS. 15a, 15b, and 15c are a perspective view, plan view, and sectional view, respectively, of the Working Example 7 base for a flow controller.
Figure 15B:
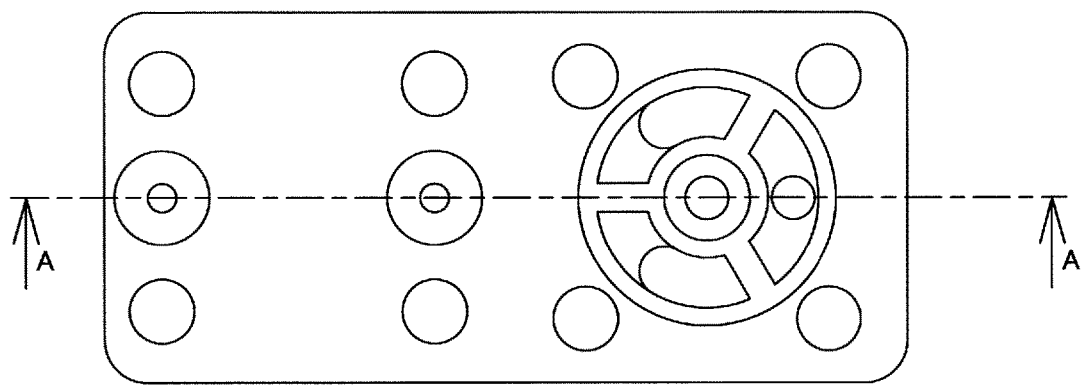
Figure 15C:
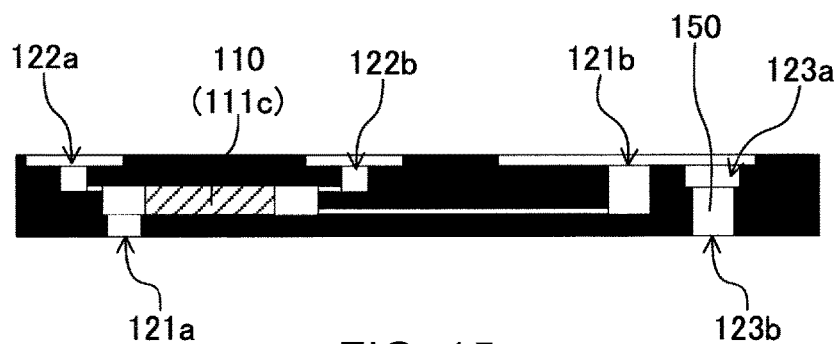
Figure 17A:
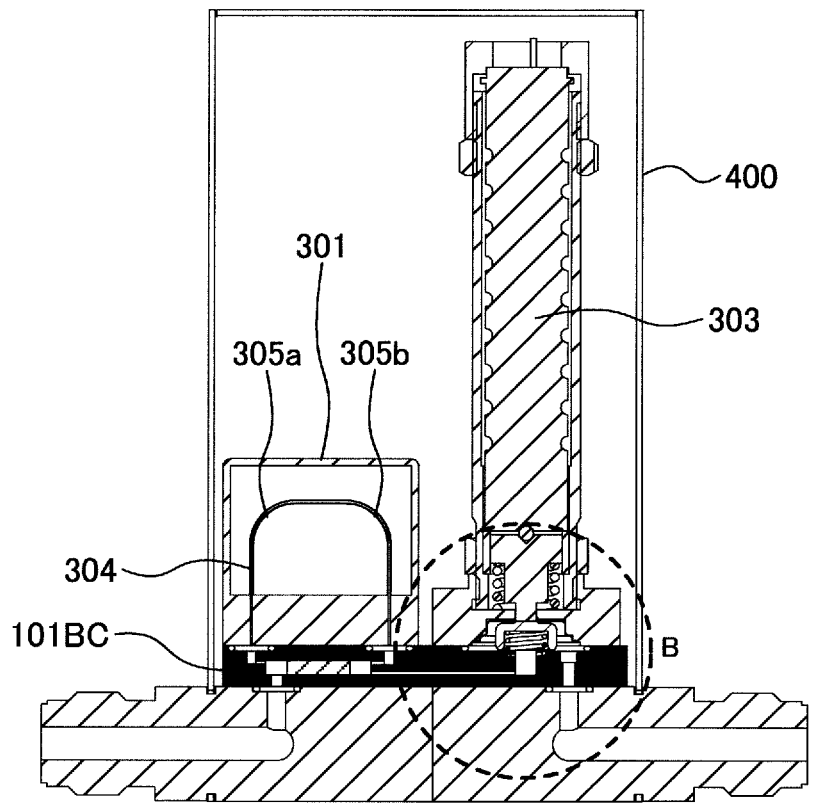
Figure 17B:
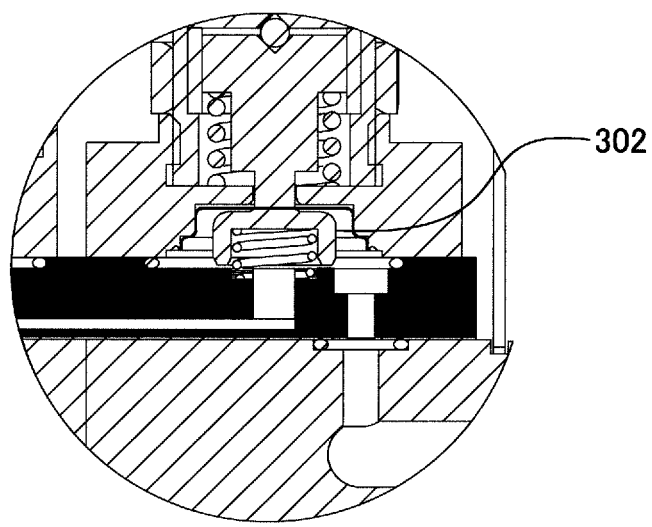

Furthermore, as shown in FIG. 15c, which is a schematic sectional view of the Working Example 7 base for a flow controller 101BC by a cross-section A-A shown in FIG. 15b, an independent flow passage 150 that is a flow passage which airtightly communicates with the fifth inlet hole 123a and the fifth outlet hole 123b, but does not communicates with the groove 111c is further formed in at least one first member 111. A black-lacquered region in FIG. 15c expresses a cross-sectional region, in which portions of the first members 111, which constitutes the Working Example 7 base for a flow controller 101BC, with neither through-hole nor groove formed are laminated to be a block. Moreover, a shaded region expresses a cross-sectional region, in which the groove 111c is formed.

Figure 14:
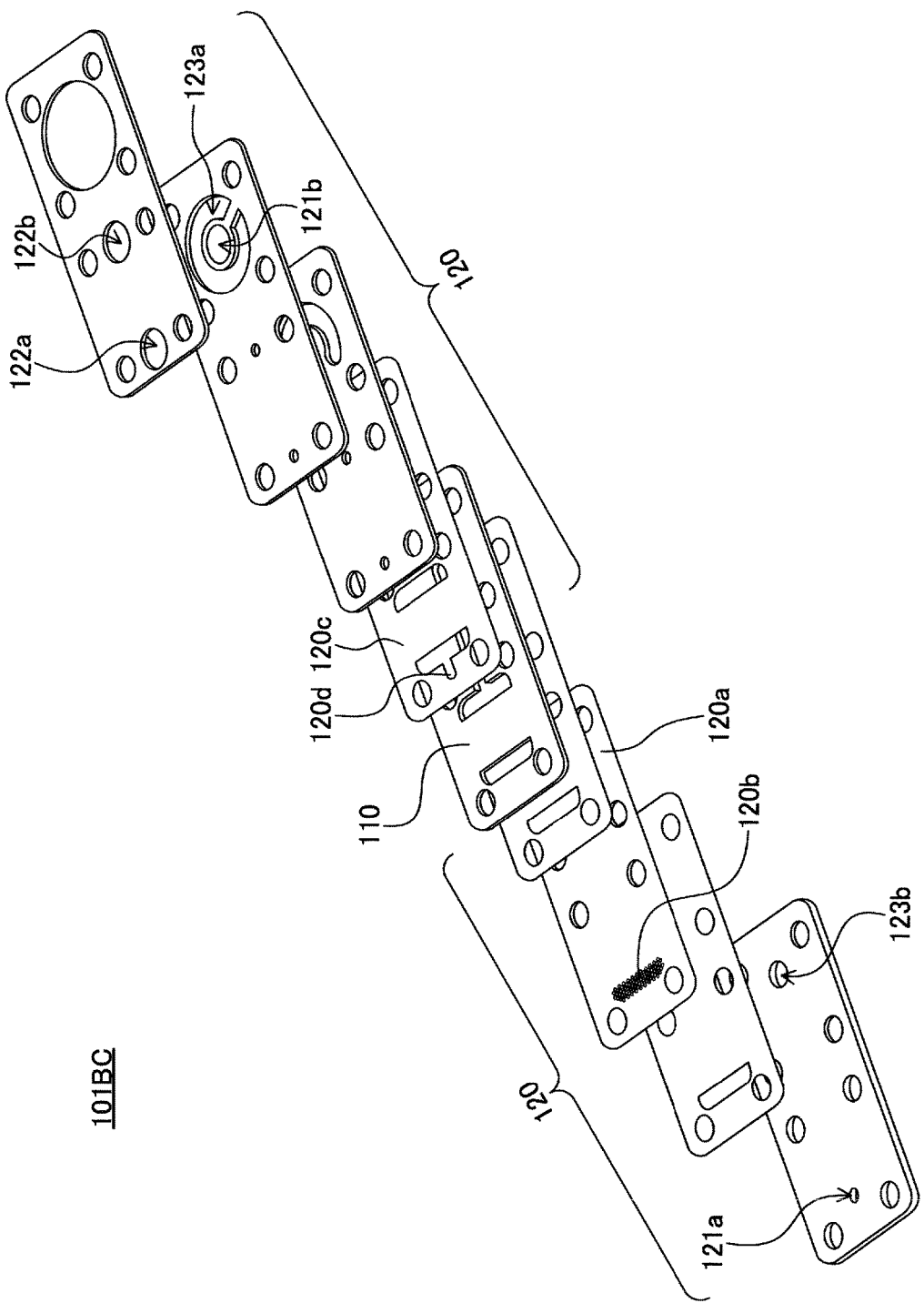
FIG. 14 is a schematic view for showing a configuration of a base for a flow controller according to a Working Example 7 of the present invention (Working Example 7 base for a flow controller).

In FIG. 14, the first members 111 which the Working Example 7 base for a flow controller 101 BC comprises is collectively shown as a bypass part 110. Moreover, a mesh 120b for preventing a foreign matter from entering a bypass flow passage is disposed at a through-hole formed in a place corresponding to the first inlet hole 111a in an external connection member 120a that is one sheet-like member which constitutes the external connection part 120. Furthermore, a slit 120d is formed in an external connection member 120c that is another sheet-like member which constitutes the external connection part 120. This is a flow passage for setting a position of the second inlet hole 122a in a desired position. The positions of the second inlet hole 121a and the second outlet hole 121b thus formed in the external connection part 120 can be suitably designed according to an intended use to which the Working Example 7 base for a flow controller 101BC is applied.

In addition, the Working Example 7 base for a flow controller 101BC shown in FIG. 15a comprises an inlet piping connecting structure, an outlet piping connecting structure, and a branch connecting structure (through-holes 131a and through-holes 131b), although they are not essential constituent elements of a base for a flow controller according to the present invention.

In addition, the Working Example 7 base for a flow controller 101BC further comprises a valve connecting structure (through-holes 131c) that is a structure for fixing a flow control valve to the Working Example 7 base for a flow controller 101BC such that the second outlet hole 121b and the fifth inlet hole 123a airtightly communicate with each other through the flow control valve, although they are not essential constituent elements of a base for a flow controller according to the present invention. Specific configuration of the valve connecting structure is the same as those of the inlet piping connecting structure, the outlet piping connecting structure, and the branch connecting structure.

Effect

The independent flow passage 150 which communicates with the fifth inlet hole 123a and the fifth outlet hole 123b is formed in the Working Example 7 base for a flow controller 101BC as mentioned above. By interposing a flow control valve between the fifth inlet hole 123a and the second outlet hole 121b which are entries of this independent flow passage, a flow controller can be constituted. Specifically, the thermal type flow meter or differential pressure type flow meter, in which the above-mentioned fourth member is connected to the inlet side branch hole 122a and the outlet side branch hole 122b, and the flow control valve are suitably connected to the Working Example 7 base for a flow controller 101BC. Then, by preparing a control part which controls an actuator for adjusting an opening of the above-mentioned flow control valve based on a detection value acquired by the above-mentioned flow meter to control a flow rate of the fluid flowing through the bypass flow passage, a flow controller can be constituted easily.

Furthermore, in accordance with the above-mentioned configuration, without requiring a special jig or tool etc., a flow control valve can be fixed to the Working Example 7 base for a flow controller 101BC such that the second outlet hole 121b and the fifth inlet hole 123a airtightly communicate with each other through the flow control valve. Namely, in accordance with the Working Example 7 base for a flow controller 101BC, an assembling process of a flow controller can be further simplified.

In addition, as a matter of course, the effect attained by the Working Example 7 base for a flow controller 101BC is attained also in a case where any of the first member 111 in which a groove is directly formed, the first member 111 constituted as a laminated object of the second member 112 and the third member 113, the first member 111 in which a groove is formed linearly, and the first member 111 in which a groove is formed vortically is adopted.

Working Example 8

Hereinafter, a thermal type flow meter according to a Working Example 8 of the present invention (which may be referred to as a "Working Example 8 thermal type flow meter" hereinafter) will be explained.

Configuration

The Working Example 8 thermal type flow meters is a thermal type flow meter which comprises the base for a flow meter according to the present invention, a sensor tube, and a pair of sensor wires wound around the sensor tube, and acquires a detection value corresponding to a flow rate of fluid flowing into the inside of the sensor tube through the inlet side branch hole 122*a* and flowing out of the inside of the sensor tube through the outlet side branch hole 112*b*, based on a difference in electric-resistance value between the above-mentioned pair of the sensor wires. Since a general configuration of a thermal type flow meter is well-known to a person skilled in the art, explanation thereof is omitted here. Moreover, since the configuration and effect of the base for a flow meter according to the present invention have been also already mentioned, explanation thereof is omitted here.

Furthermore, in the Working Example 8 thermal type flow meter, the sensor tube is fixed to the base for a flow meter according to the present invention by the above-mentioned branch connecting structure such that the inlet side branch hole 122*a* and the outlet side branch hole 122*b* airtightly communicate with each other through the inside of the sensor tube. However, the branch connecting structure is not an essential constituent element in the thermal type flow meter according to the present invention.

Effect

In the base for a flow meter according to the present invention, a bypass flow passage can be formed with higher accuracy of dimension, as compared with a conventional bypass. Therefore, the Working Example 8 thermal type flow meter constituted by the base for a flow meter according to the present invention can attain higher detection accuracy. Furthermore, inside the base for a flow meter according to the present invention, the bypass part 110 (groove 111*c*), the first inlet hole 111*a*, the first outlet hole 111*b*, the second inlet hole 121*a*, the second outlet hole 121*b*, the inlet side branch hole 122*a*, and the outlet side branch hole 122*b* are formed integrally. Therefore, the Working Example 8 thermal type flow meter constituted by the base for a flow meter according to the present invention can be manufactured by a further simplified assembling process.

Working Example 9

Hereinafter, a differential pressure type flow meter according to a Working Example 9 of the present invention (which may be referred to as a "Working Example 9 differential pressure type flow meter" hereinafter) will be explained.

Configuration

The Working Example 9 differential pressure type flow meter is a differential pressure type flow meter which comprises the base for a flow meter according to the present invention, an upstream side pressure sensor, and a downstream side pressure sensor, and acquires a detection value corresponding to a flow rate of fluid flowing in from the first inlet hole 111*a*, flowing through the groove 111*c* of the bypass part 110 and flowing out from the first outlet hole 111*b*, based on a difference in pressure detected by the upstream side pressure sensor and the downstream side pressure sensor. Since a general configuration of a differential pressure type flow meter is well-known to a person skilled in the art, explanation thereof is omitted here. Moreover, since the configuration and effect of the base for a flow meter according to the present invention have been also already mentioned, explanation thereof is omitted here.

Furthermore, in the Working Example 9 differential pressure type flow meter, the upstream side pressure sensor is fixed to the base for a flow meter according to the present invention by the above-mentioned branch connecting structure such that a detection part of the upstream side pressure sensor exposes to a space airtightly communicating with the inlet side branch hole 122*a*, and the downstream side pressure sensor is fixed to the base for a flow meter according to the present invention by the above-mentioned branch connecting structure such that a detection part of the downstream side pressure sensor exposes to a space airtightly communicating with the outlet side branch hole 122*b*. However, the branch connecting structure is not an essential constituent element in a differential pressure type flow meter according to the present invention.

Effect

In the base for a flow meter according to the present invention, a bypass flow passage can be formed with higher accuracy of dimension, as compared with a conventional bypass. Therefore, the Working Example 9 differential pressure type flow meter constituted by the base for a flow meter according to the present invention can attain higher detection accuracy. Furthermore, inside the base for a flow meter according to the present invention, the bypass part 110 (groove 111*c*), the first inlet hole 111*a*, the first outlet hole 111*b*, the second inlet hole 121*a*, the second outlet hole 121*b*, the inlet side branch hole 122*a*, and the outlet side branch hole 122*b* are formed integrally. Therefore, the Working Example 9 differential pressure type flow meter constituted by the base for a flow meter according to the present invention can be manufactured by a further simplified assembling process.

Working Example 10

Hereinafter, a thermal type flow controller according to a Working Example 10 of the present invention (which may be referred to as a "Working Example 10 thermal type flow controller" hereinafter) will be explained.

Configuration

As shown in FIGS. 16*a*-16*c* and FIGS. 17*a* and 17*b*, the Working Example 10 thermal type flow controller 101C is a thermal type flow controller which comprises a thermal type flow meter 301, a flow control valve 302, an actuator 303 configured to adjust an opening of the above-mentioned flow control valve, and a control part (not shown), and the above-mentioned control part is configured to bring a flow rate of fluid flowing into the inside of a sensor tube 304 through an inlet side branch hole 122a and flowing out of the inside of the sensor tube 304 through an outlet side branch hole 122b close to a predetermined target value by controlling the actuator 303 based on a detection value acquired by the thermal type flow meter 301 to adjust an opening of the flow control valve 302.

However, the thermal type flow meter 301 comprises the base for a flow controller according to the present invention, the sensor tube 304, and a pair of sensor wires 305a and 305b wound around the sensor tube 304, and is configured to acquire the detection value corresponding to the above-mentioned flow rate of the above-mentioned fluid, based on a difference in electric-resistance value between the pair of the sensor wires 305a and 305b. Since a general configuration of a thermal type flow meter is well-known to a person skilled in the art, further explanation thereof is omitted here. Moreover, since the configuration and effect of the Working Example 7 base for a flow controller 101BC have been also already mentioned, explanation thereof is omitted here. Black-lacquered regions in FIGS. 16a and 16b express the Working Example 7 base for a flow controller 101BC. A black-lacquered region in FIGS. 17a and 17b expresses a cross-sectional region, in which portions of the first members 111, which constitutes the Working Example 7 base for a flow controller 101BC, with neither through-hole nor groove formed are laminated to be a block. Moreover, a shaded region expresses a cross-sectional region, in which the groove 111c is formed.

Furthermore, the sensor tube 304 is fixed to the Working Example 7 base for a flow controller 101BC such that the inlet side branch hole 122a and the outlet side branch hole 122b airtightly communicate with each other through the inside of the sensor tube 304, and the flow control valve 302 is fixed to the Working Example 7 base for a flow controller 101BC such that the second outlet hole 121b and the fifth inlet hole 123a airtightly communicate with each other through the flow control valve 302.

In addition, in the Working Example 10 thermal type flow controller 101C, the sensor tube 304 is fixed to the Working Example 7 base for a flow controller 101 BC by the above-mentioned branch connecting structure such that the inlet side branch hole 122a and the outlet side branch hole 122b airtightly communicate with each other through the inside of the sensor tube 304. However, the branch connecting structure is not an essential constituent element in a thermal type flow controller according to the present invention.

Effect

In the Working Example 7 base for a flow controller 101BC, a bypass flow passage can be formed with higher accuracy of dimension, as compared with a conventional bypass. Therefore, the Working Example 10 thermal type flow controller constituted by the Working Example 7 base for a flow controller 101BC can attain higher detection accuracy. Furthermore, inside the Working Example 7 base for a flow controller 101BC, the bypass part 110 (groove 111c), the first inlet hole 111a, the first outlet hole 111b, the second inlet hole 121a, the second outlet hole 121b, the inlet side branch hole 122a, and the outlet side branch hole 122b are formed integrally. Therefore, the Working Example 10 thermal type flow controller constituted by the Working Example 7 base for a flow controller 101BC can be manufactured by a further simplified assembling process.

Working Example 11

Hereinafter, a differential pressure type flow controller according to a Working Example 11 of the present invention (which may be referred to as a "Working Example 11 differential pressure type flow controller" hereinafter) will be explained.

Configuration

The Working Example 11 differential pressure type flow controller is a differential pressure type flow controller which comprises a differential pressure type flow meter, a flow control valve, an actuator configured to adjust an opening of the above-mentioned flow control valve, and a control part, and the above-mentioned control part is configured to bring the above-mentioned flow rate of the above-mentioned fluid close to a predetermined target value by controlling the above-mentioned actuator based on a detection value acquired by the above-mentioned differential pressure type flow meter to adjust an opening of the above-mentioned flow control valve.

However, the above-mentioned differential pressure type flow meter comprises the present invention base for a flow controller, an upstream side pressure sensor, and a downstream side pressure sensor, and is configured to acquire a detection value corresponding to a flow rate of fluid flowing in from the first inlet hole 111a, flowing through the groove 111c of the bypass part 110 and flowing out from the first outlet hole 111b, based on a difference in pressure detected by the above-mentioned upstream side pressure sensor and the above-mentioned downstream side pressure sensor Furthermore, the above-mentioned upstream side pressure sensor is fixed to the above-mentioned base for a flow controller such that a detection part of the above-mentioned upstream side pressure sensor exposes to a space airtightly communicating with the inlet side branch hole 122a, and the above-mentioned downstream side pressure sensor is fixed to the above-mentioned base for a flow controller such that a detection part of the above-mentioned downstream side pressure sensor exposes to a space airtightly communicating with the outlet side branch hole 122b. In addition, the above-mentioned flow control valve is fixed to the above-mentioned base for a flow controller such that the second outlet hole 121b and the fifth inlet hole 123a airtightly communicate with each other through the above-mentioned flow control valve.

In addition, in the Working Example 11 differential pressure type flow controller, the above-mentioned upstream side pressure sensor is fixed to the above-mentioned base for a flow controller by the above-mentioned branch connecting structure such that the detection part of the above-mentioned upstream side pressure sensor exposes to a space airtightly communicating with the inlet side branch hole 122a, the above-mentioned downstream side pressure sensor is fixed to the above-mentioned base for a flow controller by the above-mentioned branch connecting structure such that the detection part of the above-mentioned downstream side pressure sensor exposes to a space airtightly communicating with the outlet side branch hole 122b, and the above-mentioned flow control valve is fixed to the above-mentioned base for a flow controller by the above-mentioned valve connecting structure such that the second outlet hole 121b and the fifth inlet hole 123a airtightly communicate with each other through the above-mentioned flow control valve. However, the branch connecting structure and valve connecting structure are not essential constituent elements in a differential pressure type flow controller according to the present invention.

Effect

In the base for a flow controller according to the present invention, a bypass flow passage can be formed with higher accuracy of dimension, as compared with a conventional bypass. Therefore, the Working Example 11 differential pressure type flow controller constituted by the base for a flow controller according to the present invention can attain higher detection accuracy. Furthermore, inside the base for a flow controller according to the present invention, the bypass part 110 (groove 111c), the first inlet hole 111a, the first outlet hole 111b, the second inlet hole 121a, the second outlet hole 121b, the inlet side branch hole 122a, and the outlet side branch hole 122b are formed integrally. Therefore, the Working Example 11 differential pressure type flow controller constituted by the base for a flow controller according to the present invention can be manufactured by a further simplified assembling process.

Although some the embodiments and modifications which have a specific configuration have been explained, sometimes referring to accompanying drawings, as the above, for the purpose of explaining the present invention, it should not be interpreted that the scope of the present invention is limited to these exemplary embodiments and modifications, and it is needless to say that modifications can be properly added within the limits of the matter described in the claims and the specification.

What is claimed is:

1. A flow apparatus comprising a bypass part that is a member having a shape of a plate, and a pair of external connection parts that is a pair of members having a shape of a plate and being laminated on two principal surfaces of said bypass part, respectively, wherein:
   said bypass part comprises one first member that is a member having a shape of a sheet, in which a first inlet hole that is at least one through-hole having a predetermined size and a predetermined shape, a first outlet hole that is at least one through-hole having a predetermined size and a predetermined shape, and at least one groove in communication with said first inlet hole and said first outlet hole are formed, or said bypass part comprises two or more said first members laminated such that said first inlet holes of said first members adjacent to each other airtightly communicate with each other and said first outlet holes of said first members adjacent to each other airtightly communicate with each other,
   a second inlet hole that is at least one through-hole having a predetermined size and a predetermined shape is formed in either of said pair of said external connection parts, and a second outlet hole that is at least one through-hole having a predetermined size and a predetermined shape is formed in either of said pair of said external connection parts,
   said first inlet hole formed in said first member and said second inlet hole formed in said external connection part are configured to airtightly communicate with each other, and said first outlet hole formed in said first member and said second outlet hole formed in said external connection part are configured to airtightly communicate with each other
   said first member is constituted as a laminated object in which a second member that is one member having a shape of a sheet and a third member that is one member having a shape of a sheet are laminated,
   a third inlet hole that is at least one through-hole having a predetermined size and a predetermined shape, a third outlet hole which is at least one through-hole which has a predetermined size and a predetermined shape, and a slit that is at least one through-hole having a predetermined width and a predetermined length are formed in said second member,
   a fourth inlet hole that is at least one through-hole having a predetermined size and a predetermined shape and a fourth outlet hole which is at least one through-hole which has a predetermined size and a predetermined shape are formed in said third member,
   said third inlet hole of said second member and said fourth inlet hole of said third member airtightly communicate with each other to form said first inlet hole in said first member, and said third outlet hole of said second member and said fourth outlet hole of said third member airtightly communicate with each other to form said first outlet hole in said first member,
   an inlet end that is an end closer to said third inlet hole among both ends of said slit and said third inlet hole are configured to airtightly communicate with each other through said fourth inlet hole, and an outlet end that is an end closer to said third outlet hole among both ends of said slit and said third outlet hole are configured to airtightly communicate with each other through said fourth outlet hole, and
   an aperture plane other than said inlet end and said outlet end of said slit formed in said second member is airtightly closed with a portion of said third member where said fourth inlet hole and said fourth outlet hole are not formed to form said groove in said first member.

2. The flow apparatus according to claim 1, wherein:
   in a parallel-projected projection view projected to a plane parallel to said principal surface of said bypass part, said fourth inlet hole is formed to overlap with at least a part of said third inlet hole and said inlet end, and said fourth outlet hole is formed to overlap with at least a part of said third outlet hole and said outlet end.

3. The flow apparatus according to claim 1, wherein:
   in a parallel-projected projection view projected to a plane parallel to said principal surface of said bypass part, said groove is formed linearly.

4. The flow apparatus according to claim 1, wherein:
   in a parallel-projected projection view projected to a plane parallel to said principal surface of said bypass part, said groove is formed vortically.

5. The flow apparatus according to claim 1, further comprising:
   an inlet piping connecting structure that is a structure for fixing an inlet piping, which introduces fluid from the outside, to said bypass unit such that said inlet piping and said second inlet hole airtightly communicate with each other, and
   an outlet piping connecting structure that is a structure for fixing an outlet piping, which outputs fluid to the outside, to said bypass unit such that said outlet piping and said second outlet hole airtightly communicate with each other.

6. A flow apparatus comprising a base for a flow meter, the base comprising:

a bypass part that is a member having a shape of a plate, and a pair of external connection parts that is a pair of members having a shape of a plate and being laminated on two principal surfaces of said bypass part, respectively, wherein:

said bypass part comprises:
- one first member that is a member having a shape of a sheet, in which a first inlet hole that is at least one through-hole having a predetermined size and a predetermined shape, a first outlet hole that is at least one through-hole having a predetermined size and a predetermined shape, and at least one groove in communication with said first inlet hole and said first outlet hole are formed, or said bypass part comprises two or more said first members laminated such that said first inlet holes of said first members adjacent to each other airtightly communicate with each other and said first outlet holes of said first members adjacent to each other airtightly communicate with each other;
- a second inlet hole that is at least one through-hole having a predetermined size and a predetermined shape is formed in either of said pair of said external connection parts, and a second outlet hole that is at least one through-hole having a predetermined size and a predetermined shape is formed in either of said pair of said external connection parts; and
- said first inlet hole formed in said first member and said second inlet hole formed in said external connection part are configured to airtightly communicate with each other, and said first outlet hole formed in said first member and said second outlet hole formed in said external connection part are configured to airtightly communicate with each other;
  - said first member is constituted as a laminated object in which a second member that is one member having a shape of a sheet and a third member that is one member having a shape of a sheet are laminated,
  - a third inlet hole that is at least one through-hole having a predetermined size and a predetermined shape, a third outlet hole which is at least one through-hole which has a predetermined size and a predetermined shape, and a slit that is at least one through-hole having a predetermined width and a predetermined length are formed in said second member,
  - a fourth inlet hole that is at least one through-hole having a predetermined size and a predetermined shape and a fourth outlet hole which is at least one through-hole which has a predetermined size and a predetermined shape are formed in said third member,
  - said third inlet hole of said second member and said fourth inlet hole of said third member airtightly communicate with each other to form said first inlet hole in said first member, and said third outlet hole of said second member and said fourth outlet hole of said third member airtightly communicate with each other to form said first outlet hole in said first member,
  - an inlet end that is an end closer to said third inlet hole among both ends of said slit and said third inlet hole are configured to airtightly communicate with each other through said fourth inlet hole, and an outlet end that is an end closer to said third outlet hole among both ends of said slit and said third outlet hole are configured to airtightly communicate with each other through said fourth outlet hole, and
  - an aperture plane other than said inlet end and said outlet end of said slit formed in said second member is airtightly closed with a portion of said third member where said fourth inlet hole and said fourth outlet hole are not formed to form said groove in said first member; and
- an inlet side branch hole that is at least one through-hole having a predetermined size and a predetermined shape and airtightly communicating with said first inlet hole is further formed in either of said pair of said external connection parts, and
- an outlet side branch hole that is at least one through-hole having a predetermined size and a predetermined shape and airtightly communicating with said first outlet hole is further formed in either of said pair of said external connection parts.

7. The flow apparatus of claim 6 including a thermal type flow meter including the base for a flow meter, a sensor tube and a pair of sensor wires wound around said sensor tube, wherein the thermal type flow meter is configured to acquire a detection value corresponding to a flow rate of fluid flowing into the inside of said sensor tube through said inlet side branch hole and flowing out of the inside of said sensor tube through said outlet side branch hole, based on a difference in electric-resistance value between said pair of said sensor wires, wherein:
  said sensor tube is fixed to said base for a flow meter such that said inlet side branch hole and said outlet side branch hole airtightly communicate with each other through the inside of said sensor tube.

8. The flow apparatus of claim 6 including a differential pressure type flow meter including the base for a flow meter, an upstream side pressure sensor and a downstream side pressure sensor, wherein the differential pressure type flow meter is configured to acquire a detection value corresponding to a flow rate of fluid flowing in from said first inlet hole, flowing through said groove of said bypass part and flowing out from said first outlet hole, based on a difference in pressure detected by said upstream side pressure sensor and said downstream side pressure sensor, wherein:
  said upstream side pressure sensor is fixed to said base for a flow meter such that a detection part of said upstream side pressure sensor exposes to a space airtightly communicating with said inlet side branch hole, and
  said downstream side pressure sensor is fixed to said base for a flow meter such that a detection part of said downstream side pressure sensor exposes to a space airtightly communicating with said outlet side branch hole.

9. The flow apparatus of claim 6, further comprising:
  a branch connecting structure that is a structure for fixing a fourth member that is a separate member, which has an internal space, to said base for a flow meter such that said inlet side branch hole and/or said outlet side branch hole airtightly communicate with said internal space.

10. The flow apparatus of claim 9 including a thermal type flow meter which comprises the base for a flow meter, a sensor tube as said fourth member, and a pair of sensor wires wound around said sensor tube, and the thermal type flow meter is configured to acquire a detection value corresponding to a flow rate of fluid flowing into the inside of said sensor tube through said inlet side branch hole and flowing out of the inside of said sensor tube through said outlet side branch hole, based on a difference in electric-resistance value between said pair of said sensor wires, wherein:
said sensor tube is fixed to said base for a flow meter by said branch connecting structure such that said inlet side branch hole and said outlet side branch hole airtightly communicate with each other through the inside of said sensor tube.

11. The flow apparatus of claim 9 including a differential pressure type flow meter which comprises the base for a flow meter, an upstream side pressure sensor as said fourth member, and a downstream side pressure sensor as said fourth member, and the differential pressure type flow meter is configured to acquire a detection value corresponding to a flow rate of fluid flowing in from said first inlet hole, flowing through said groove of said bypass part and flowing out from said first outlet hole, based on a difference in pressure detected by said upstream side pressure sensor and said downstream side pressure sensor, wherein:
said upstream side pressure sensor is fixed to said base for a flow meter by said branch connecting structure such that a detection part of said upstream side pressure sensor exposes to a space airtightly communicating with said inlet side branch hole, and
said downstream side pressure sensor is fixed to said base for a flow meter by said branch connecting structure such that a detection part of said downstream side pressure sensor exposes to a space airtightly communicating with said outlet side branch hole.

12. The flow apparatus of claim 6 including a base for a flow controller comprising the base for a flow meter, wherein:
a fifth inlet hole that is at least one through-hole having a predetermined size and a predetermined shape is further formed in either of said pair of said external connection parts, and a fifth outlet hole that is at least one through-hole having a predetermined size and a predetermined shape is further formed in either of said pair of said external connection parts, and
an independent flow passage that is a flow passage which makes said fifth inlet hole and said fifth outlet hole airtightly communicate with each other and does not communicate with said groove is further formed in at least one of said first member.

13. The flow apparatus of claim 12 comprising a thermal type flow controller which comprises a thermal type flow meter comprising the base for a flow controller, a sensor tube, and a pair of sensor wires wound around said sensor tube, and being configured to acquire a detection value corresponding to a flow rate of fluid flowing into the inside of said sensor tube through said inlet side branch hole and flowing out of the inside of said sensor tube through said outlet side branch hole, based on a difference in electric-resistance value between said pair of said sensor wires, a flow control valve, an actuator configured to adjust an opening of said flow control valve, and a control part, and
said control part is configured to bring said flow rate of said fluid close to a predetermined target value by controlling said actuator based on said detection value acquired by said thermal type flow meter to adjust said opening of said flow control valve, wherein:
said sensor tube is fixed to said base for a flow controller such that said inlet side branch hole and said outlet side branch hole airtightly communicate with each other through the inside of said sensor tube, and
said flow control valve is fixed to said base for a flow controller such that said second outlet hole and said fifth inlet hole airtightly communicate with each other through said flow control valve.

14. The flow apparatus of claim 12 comprising a differential pressure type flow controller which comprises a differential pressure type flow meter comprising the base for a flow controller, an upstream side pressure sensor, and a downstream side pressure sensor, and being configured to acquire a detection value corresponding to a flow rate of fluid flowing in from said first inlet hole, flowing through said groove of said bypass part and flowing out from said first outlet hole, based on a difference in pressure detected by said upstream side pressure sensor and said downstream side pressure sensor, a flow control valve, an actuator configured to adjust an opening of said flow control valve, and a control part, and
said control part is configured to bring said flow rate of said fluid close to a predetermined target value by controlling said actuator based on said detection value acquired by said differential pressure type flow meter to adjust said opening of said flow control valve, wherein:
said upstream side pressure sensor is fixed to said base for a flow controller such that a detection part of said upstream side pressure sensor exposes to a space airtightly communicating with said inlet side branch hole,
said downstream side pressure sensor is fixed to said base for a flow controller such that a detection part of said downstream side pressure sensor exposes to a space airtightly communicating with said outlet side branch hole, and
said flow control valve is fixed to said base for a flow controller such that said second outlet hole and said fifth inlet hole airtightly communicate with each other through said flow control valve.

15. The flow apparatus of claim 12 comprising:
a valve connecting structure that is a structure for fixing a flow control valve to said base for a flow controller such that said second outlet hole and said fifth inlet hole airtightly communicate with each other through said flow control valve.

16. The flow apparatus of claim 15 comprising thermal type flow controller which comprises a thermal type flow meter comprising the base for a flow controller, a sensor tube as said fourth member, and a pair of sensor wires wound around said sensor tube, and being configured to acquire a detection value corresponding to a flow rate of fluid flowing into the inside of said sensor tube through said inlet side branch hole and flowing out of the inside of said sensor tube through said outlet side branch hole, based on a difference in electric-resistance value between said pair of said sensor wires, a flow control valve, an actuator configured to adjust an opening of said flow control valve, and a control part, and
said control part is configured to bring said flow rate of said fluid close to a predetermined target value by controlling said actuator based on said detection value acquired by said thermal type flow meter to adjust said opening of said flow control valve, wherein:
said sensor tube is fixed to said base for a flow controller by a branch connecting structure such that said inlet side branch hole and said outlet side branch hole airtightly communicate with each other through the inside of said sensor tube, and
said flow control valve is fixed to said base for a flow controller by said valve connecting structure such that said second outlet hole and said fifth inlet hole airtightly communicate with each other through said flow control valve.

17. The flow apparatus of claim 15 comprising a differential pressure type flow controller which comprises a differential pressure type flow meter comprising the base for a flow controller, an upstream side pressure sensor as said fourth member, and a downstream side pressure sensor as said fourth member, and being configured to acquire a detection value corresponding to a flow rate of fluid flowing in from said first inlet hole, flowing through said groove of said bypass part and flowing out from said first outlet hole, based on a difference in pressure detected by said upstream side pressure sensor and said downstream side pressure sensor, a flow control valve, an actuator configured to adjust an opening of said flow control valve, and a control part, and said control part is configured to bring said flow rate of said fluid close to a predetermined target value by controlling said actuator based on said detection value acquired by said differential pressure type flow meter to adjust said opening of said flow control valve, wherein:

said upstream side pressure sensor is fixed to said base for a flow controller by a branch connecting structure such that a detection part of said upstream side pressure sensor exposes to a space airtightly communicating with said inlet side branch hole, said downstream side pressure sensor is fixed to said base for a flow controller by said branch connecting structure such that a detection part of said downstream side pressure sensor exposes to a space airtightly communicating with said outlet side branch hole, and said flow control valve is fixed to said base for a flow controller by said valve connecting structure such that said second outlet hole and said fifth inlet hole airtightly communicate with each other through said flow control valve.

* * * * *